US012071796B2

(12) United States Patent
Kashiwaguma et al.

(10) Patent No.: US 12,071,796 B2
(45) Date of Patent: Aug. 27, 2024

(54) HINGE MOUNTING STRUCTURE

(71) Applicant: SUGATSUNE KOGYO CO., LTD., Tokyo (JP)

(72) Inventors: Kazuaki Kashiwaguma, Tokyo (JP); Yukihiko Ogawa, Tokyo (JP)

(73) Assignee: SUGATSUNE KOGYO CO., LTD., Tokyo (JP)

( * ) Notice: Subject to any disclaimer, the term of this patent is extended or adjusted under 35 U.S.C. 154(b) by 0 days.

(21) Appl. No.: 18/000,105

(22) PCT Filed: Mar. 12, 2021

(86) PCT No.: PCT/JP2021/010016

§ 371 (c)(1),
(2) Date: Nov. 28, 2022

(87) PCT Pub. No.: WO2021/240953

PCT Pub. Date: Dec. 2, 2021

(65) Prior Publication Data

US 2023/0193671 A1 Jun. 22, 2023

(30) Foreign Application Priority Data

May 29, 2020 (JP) ................................ 2020-094092
Nov. 27, 2020 (JP) ................................ 2020-196876

(51) Int. Cl.
*E05D 11/00* (2006.01)
*E05D 3/02* (2006.01)
(Continued)

(52) U.S. Cl.
CPC ................ *E05D 3/02* (2013.01); *E05D 5/06* (2013.01); *E05D 7/0415* (2013.01);
(Continued)

(58) Field of Classification Search
CPC .. E06B 1/52; E05Y 2900/132; E05Y 2201/11; E05D 2011/0063;
(Continued)

(56) References Cited

U.S. PATENT DOCUMENTS 2,211,581 A * 8/1940 Ross .................. E05D 11/0027 16/364
2,742,117 A * 4/1956 Tolman .................. E06B 1/603 49/505
(Continued)

FOREIGN PATENT DOCUMENTS

CN 200958323 Y 10/2007
CN 202249364 U 5/2012
(Continued)

OTHER PUBLICATIONS

WIPO, Japanese International Search Authority, International Search Report (with English translation) and Written Opinion (with English translation) mailed on Apr. 13, 2021 in International Patent Application No. PCT/JP2021/010016, 11 pages.
(Continued)

*Primary Examiner* — Jason W San
(74) *Attorney, Agent, or Firm* — MASUVALLEY & PARTNERS; Peter Martinez

(57) ABSTRACT

A hinge mounting structure is provided whose appearance can be improved. In a hinge mounting structure including a hinge (1) having a first piece (3) and a second piece (4) that are coupled together via a shaft (2) in such a manner as to be rotatable relative to each other, the first piece (3) being mounted on a side jamb (6), the second piece (4) being mounted on a door (5), the side jamb (6) is provided with a protruding portion (8) protruding forward of a wall surface,
(Continued)

and a center (C) of the shaft (2) is placed backward of a front surface line (X) of the protruding portion (8) of the side jamb (6).

6 Claims, 27 Drawing Sheets

(51) Int. Cl.
*E05D 5/06* (2006.01)
*E05D 7/04* (2006.01)
*E06B 1/52* (2006.01)

(52) U.S. Cl.
CPC ............ *E05D 11/0054* (2013.01); *E06B 1/52* (2013.01); *E05D 2003/027* (2013.01); *E05D 2007/0469* (2013.01); *E05D 2007/0484* (2013.01); *E05D 2007/0492* (2013.01); *E05D 2011/0063* (2013.01); *E05Y 2201/11* (2013.01); *E05Y 2900/132* (2013.01)

(58) Field of Classification Search
CPC ...... E05D 2007/0484; E05D 2003/027; E05D 11/0054; E05D 5/06; E05D 3/02
See application file for complete search history.

(56) References Cited

U.S. PATENT DOCUMENTS

| | | | | | |
|---|---|---|---|---|---|
| 3,300,809 | A * | 1/1967 | Neerman | E05D 5/02 16/389 |
| 3,439,377 | A * | 4/1969 | Bucholz | E05D 5/065 16/389 |
| 3,510,906 | A | 5/1970 | Baldwin, Sr. | |
| 4,034,514 | A * | 7/1977 | Cecil | E06B 1/52 49/504 |
| 4,369,600 | A * | 1/1983 | Passovoy | E06B 1/526 49/504 |
| 5,755,011 | A * | 5/1998 | Green | E05D 7/0423 16/241 |
| 6,845,544 | B2 * | 1/2005 | Hofer | E05D 7/0423 16/245 |
| 8,276,241 | B2 * | 10/2012 | Wu | E05D 7/0415 16/382 |
| 8,739,367 | B2 * | 6/2014 | Park | E05D 5/06 16/245 |
| 9,708,841 | B1 * | 7/2017 | Kar | E05D 11/0054 |
| 10,221,598 | B2 * | 3/2019 | Dolman | E05D 11/0054 |
| 2002/0035765 | A1 * | 3/2002 | Baer | E05D 5/0238 16/354 |
| 2003/0233731 | A1 * | 12/2003 | Cotton | E05D 11/0054 16/250 |
| 2011/0094057 | A1 * | 4/2011 | Duffy | E05D 11/0054 16/382 |
| 2013/0014345 | A1 * | 1/2013 | Park | E05D 5/06 16/248 |
| 2015/0135480 | A1 * | 5/2015 | Bartels | E05D 7/04 16/237 |
| 2015/0300065 | A1 * | 10/2015 | Cooper | E05D 11/0054 16/250 |
| 2015/0361699 | A1 * | 12/2015 | Manzoni | E05D 11/0054 16/251 |
| 2017/0247920 | A1 * | 8/2017 | Dolman | E05D 7/04 |
| 2019/0071904 | A1 * | 3/2019 | Migliorini | E05D 7/0415 |
| 2019/0071906 | A1 * | 3/2019 | Migliorini | E05D 7/0423 |
| 2023/0193671 | A1 * | 6/2023 | Kashiwaguma | E06B 1/52 16/233 |

FOREIGN PATENT DOCUMENTS

| | | | |
|---|---|---|---|
| CN | 209761128 | U | 12/2019 |
| FR | 2829792 | B3 | 9/2003 |
| JP | 6-004292 | A | 1/1994 |
| JP | 9-100670 | A | 4/1997 |
| JP | 11-131891 | A | 5/1999 |
| JP | 11-241550 | A | 9/1999 |
| JP | 2000345773 | A | 12/2000 |
| JP | 2003-138845 | A | 5/2003 |
| JP | 2005299253 | A | 10/2005 |
| JP | 2014-095289 | A | 5/2014 |
| JP | 2017-053108 | A | 3/2017 |
| JP | 2017-133341 | A | 8/2017 |
| JP | 2020-060093 | A | 4/2020 |
| KR | 20170097513 | A | 8/2017 |

OTHER PUBLICATIONS

European Patent Office, Extended European Search Report dated Jun. 4, 2024 in European Patent Application No. 21813206.6, 7 pages.
China National Intellectual Property Administration, Office Action dated May 15, 2024 with English translation in Chinese Patent Application No. 202180032552.9, 14 pages.

* cited by examiner (a)

(b)

HINGE MOUNTING STRUCTURE

RELATED APPLICATIONS

This application is the U.S. National Phase of and claims priority to International Patent Application No. PCT/JP2021/010016, International Filing Date Mar. 12, 2021; which claims benefit of Japanese Patent Application No. 2020-094092 filed May 29, 2020 and Japanese Patent Application No. 2020-196876 filed Nov. 27, 2020; all of which are incorporated herein by reference in their entireties.

TECHNICAL FIELD

The present invention relates to a hinge mounting structure used mainly in a building structure.

BACKGROUND ART

A hinge mounting structure is conventionally known which includes a hinge having a first piece and a second piece that are coupled together via a shaft in such a manner as to be rotatable relative to each other, the first piece being mounted on a side jamb, the second piece being mounted on a door. In the known hinge mounting structure, the shaft of the hinge is placed forward of the front surface of the side jamb to open the door at a wide angle. However, if the shaft of the hinge is placed in this manner, the shaft of the hinge juts out from the side jamb. Therefore, there is a problem of bad appearance. In order to solve the problem, Patent Literature 1 discloses a hinge mounting structure where a shaft of a hinge is recessed to place the center of the shaft of the hinge in the same position as a front surface line of the side jamb.

CITATION LIST

Patent Literature

Patent Literature 1: JP H11-131891 A

SUMMARY OF INVENTION

Technical Problem

However, in the hinge mounting structure described in Patent Literature 1, the center of the shaft of the hinge can be recessed only to the same position as the front surface line of the side jamb. Since half the shaft of the hinge protrudes from the front surface of the side jamb, the appearance cannot be improved that much.

The present invention has been made considering the above problem, and an object thereof is to provide a hinge mounting structure whose appearance can be improved.

Solution to Problem

In order to solve the above problem, one aspect of the present invention is a hinge mounting structure including a hinge having a first piece and a second piece that are coupled together via a shaft in such a manner as to be rotatable relative to each other, the first piece being mounted on a side jamb, the second piece being mounted on a door, in which the side jamb is provided with a protruding portion protruding forward of a wall surface, and a center of the shaft is placed backward of a front surface line of the protruding portion of the side jamb.

Advantageous Effects of Invention

According to the present invention, since the center of the shaft is placed backward of the front surface line of the protruding portion of the side jamb, the appearance thereof can be improved.

BRIEF DESCRIPTION OF DRAWINGS

(FIG. 22(*a*) illustrates a state with covers mounted, and FIG. 22(*b*) illustrates a state with the covers removed).

DESCRIPTION OF EMBODIMENTS

Embodiments of a hinge mounting structure of the present invention are described in detail hereinafter with reference to the accompanying drawings. However, the hinge mounting structure of the present invention can be embodied in various modes, and is not limited to the embodiments described in the description. The embodiments are provided with the intention of enabling those skilled in the art to fully understand the invention by fully disclosing the description.

First Embodiment

Figure 1:
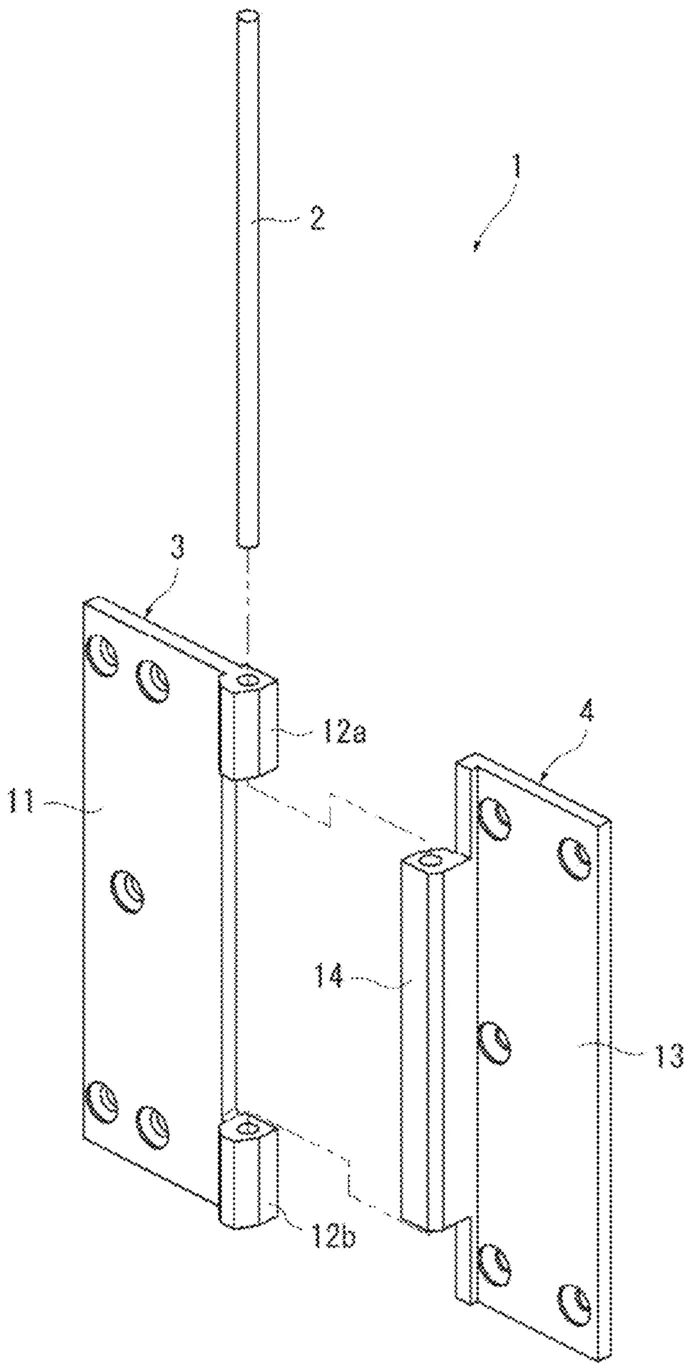
FIG. 1 is an exploded perspective view of a hinge that is used in a hinge mounting structure of a first embodiment of the present invention.

FIG. 1 is an exploded perspective view of a hinge that is used in a hinge mounting structure of a first embodiment of the present invention. A hinge 1 includes a shaft 2, and a first piece 3 and a second piece 4 that are coupled together via the shaft 2 in such a manner as to be rotatable relative to each other. The first piece 3 includes an approximately rectangular main body portion 11, and tubular portions 12*a* and 12*b*. The two tubular portions 12*a* and 12*b* are formed integrally with an edge in a width direction of the main body portion 11. The second piece 4 includes an approximately rectangular main body portion 13 and a tubular portion 14. The one tubular portion 14 is formed integrally with an edge in a width direction of the main body portion 13. The shaft 2 is inserted into the tubular portions 12*a* and 12*b* of the first piece 3 and the tubular portion 14 of the second piece 4. The tubular portion 14 of the second piece 4 is placed between the tubular portions 12*a* and 12*b* of the first piece 3. The height of the man body portion 13 of the second piece 4 is approximately equal to the height of the main body portion 11 of the first piece 3. The shapes of the first piece 3 and the second piece 4 are examples, and are not limited to these shapes.

Figure 2:
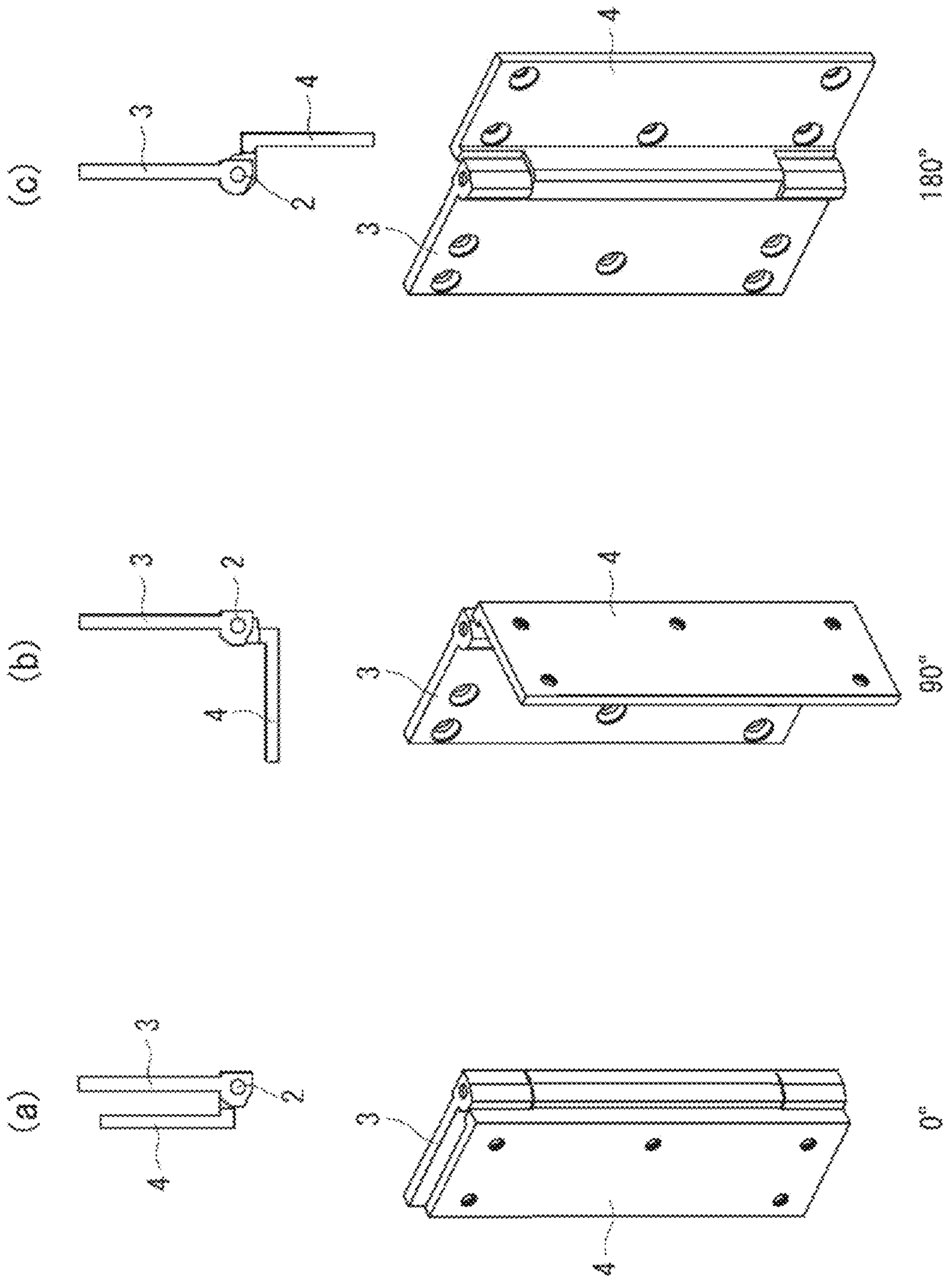
FIG. 2 is operating diagrams of the hinge (FIG. 2(*a*) illustrates a closed position of a second piece, FIG. 2(*b*) illustrates a 90-degree open position of the second piece, and FIG. 2(*c*) illustrates a 180-degree open position of the second piece).

FIG. 2 is operating diagrams of the hinge 1. The upper part of FIG. 2 represents a plan view of the hinge 1, and the lower part of FIG. 2 represents a perspective view of the hinge 1. FIG. 2(*a*) illustrates a closed position (a 0-degree open position) of the second piece 4, FIG. 2(*b*) illustrates a 90-degree open position of the second piece 4, and FIG. 2(*c*) illustrates a 180-degree open position of the second piece 4. The second piece 4 can rotate from 0 degrees to approximately 180 degrees relative to the first piece 3.

In plan view, the first piece 3 has an approximate I-shape, and the second piece 4 has an approximate L-shape. The main body portion 11 of the first piece 3 is parallel to the main body portion 13 of the second piece 4 (the long-side side of the main body portion of the approximate L-shape) in the closed position of the second piece 4. The first piece 3 is orthogonal to the second piece 4 in the 90-degree open position of the second piece 4. The first piece 3 and the second piece 4 are in an unfolded state and are parallel to each other, in the 180-degree open position of the second piece 4. The planar shapes of the first piece 3 and the second piece 4 are not limited to the approximate I-shape and the approximate L-shape.

Figure 3:
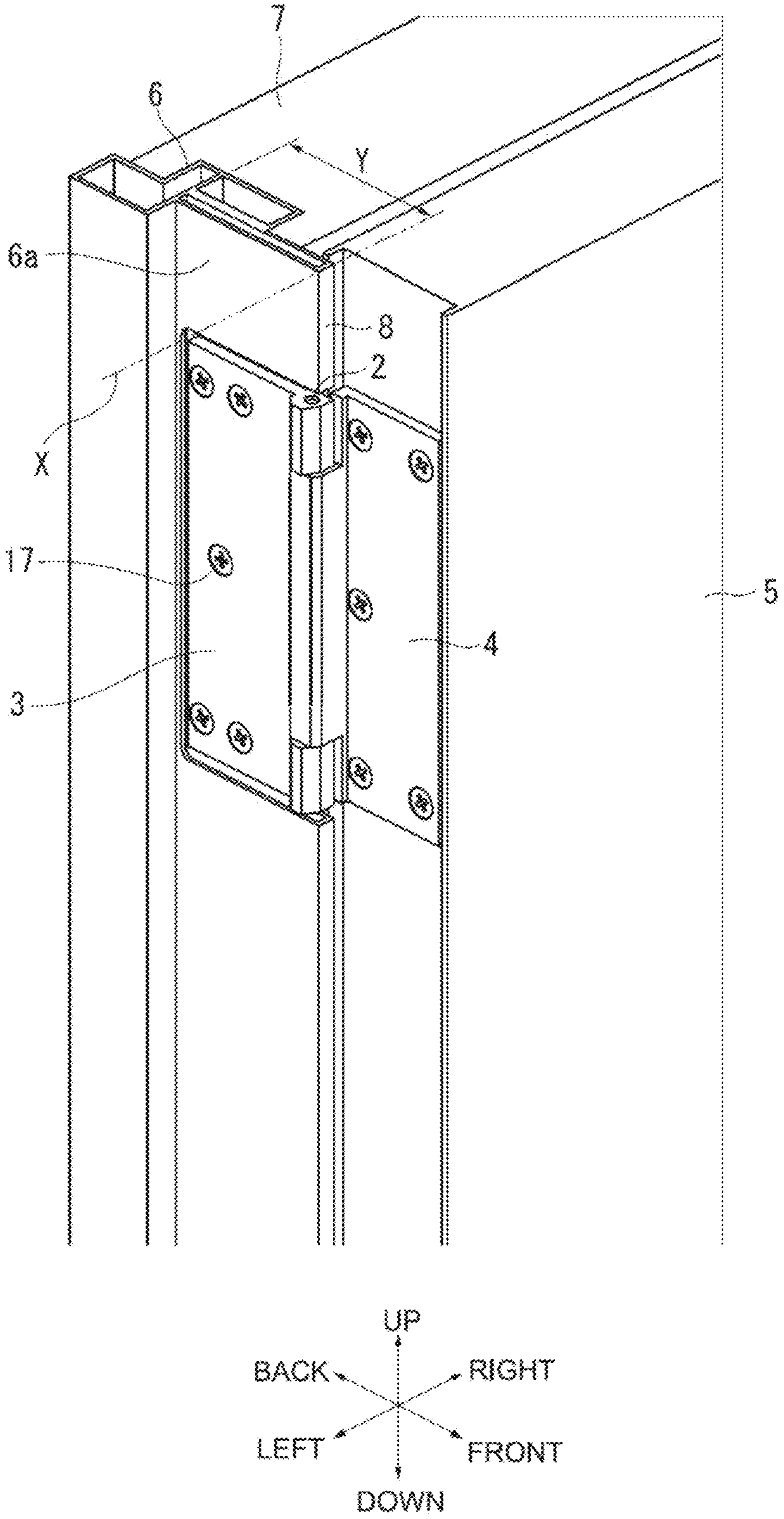
FIG. 3 is a perspective view of the hinge mounting structure (with a door in an open position).
Figure 4:
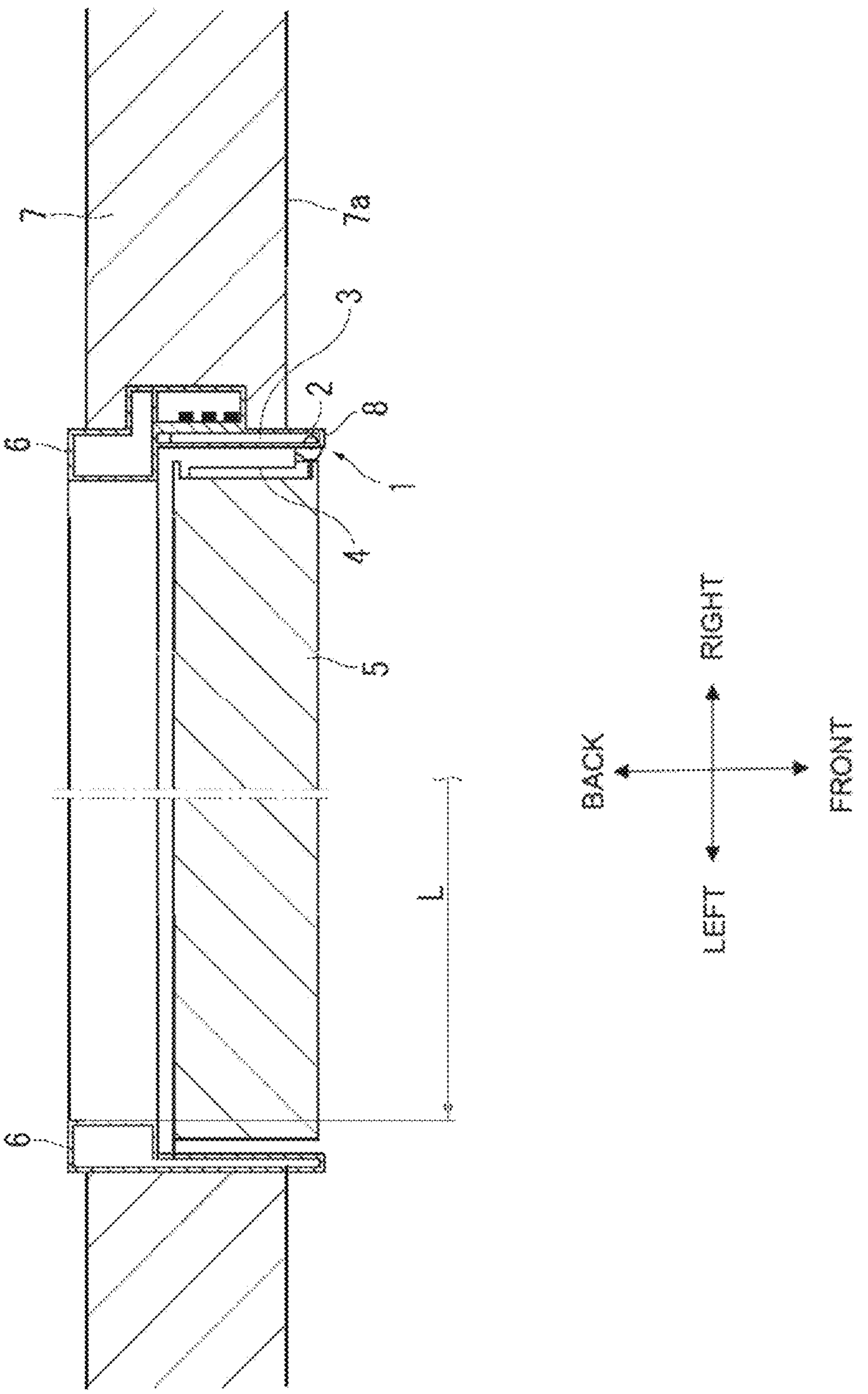
FIG. 4 is a horizontal cross-sectional view of the hinge mounting structure (with the door in a closed position).

FIG. 3 is a perspective view of the hinge mounting structure of the embodiment (with a door 5 in an open position). FIG. 4 is a horizontal cross-sectional view of the hinge mounting structure of the embodiment (with the door 5 in a closed position). For convenience of description, the directions in a front view from the opening side of the door 5 in the closed position, that is, the directions of front and back, up and down, and left and right in FIGS. 3 and 4 are used below to describe the hinge mounting structure.

The first piece 3 of the hinge 1 is mounted on one of side jambs 6, 6 (refer to FIG. 4) placed to the left and right of the door 5. The second piece 4 of the hinge 1 is mounted on an end face (edge) of the door 5. The side jamb 6 is mounted on a wall 7. The side jamb 6 is provided with a protruding portion 8 protruding forward of a wall surface 7*a*. The protruding portion 8 extends beyond the height of the door 5 in the up-and-down direction. The side jamb 6 includes, in an inside surface thereof, an appropriately deep cut portion 6*a* formed with a depth Y greater than the thickness of the door 5.

Figure 5:
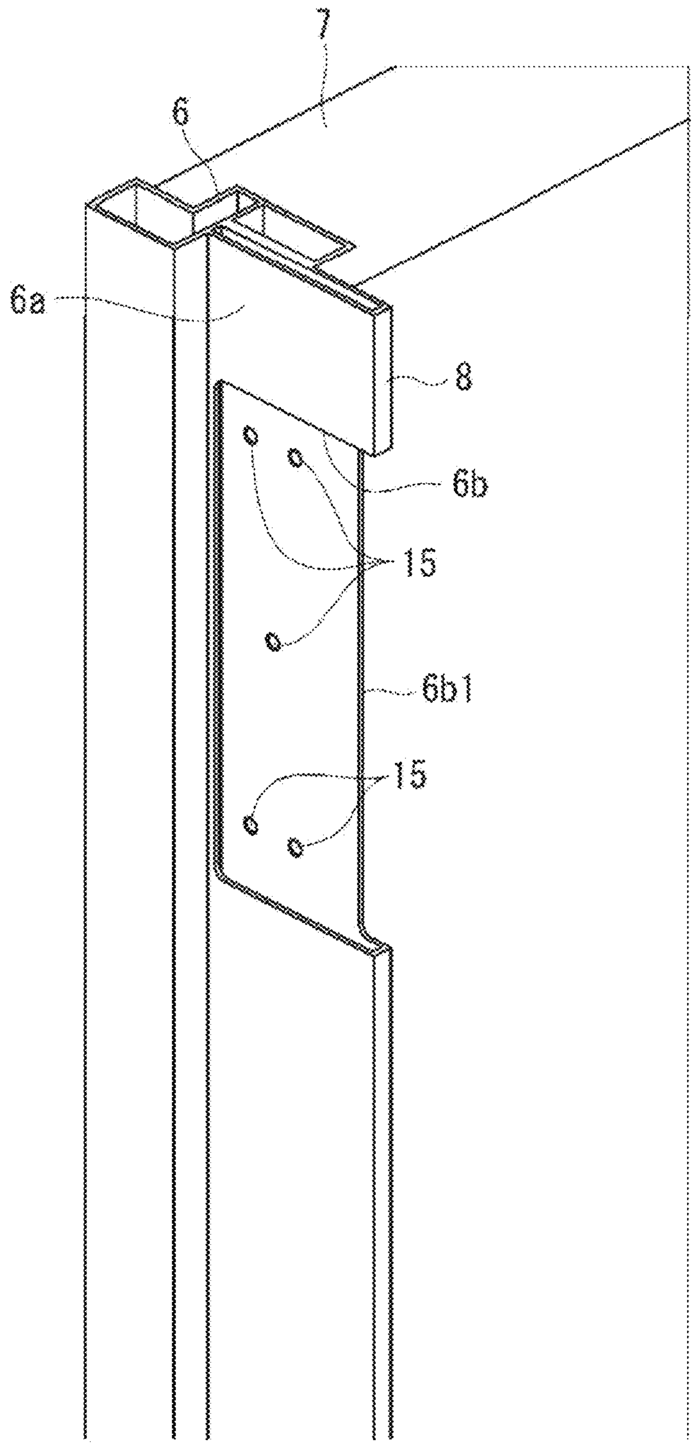
FIG. 5 is a perspective view of a side jamb of the hinge mounting structure.
Figure 6:
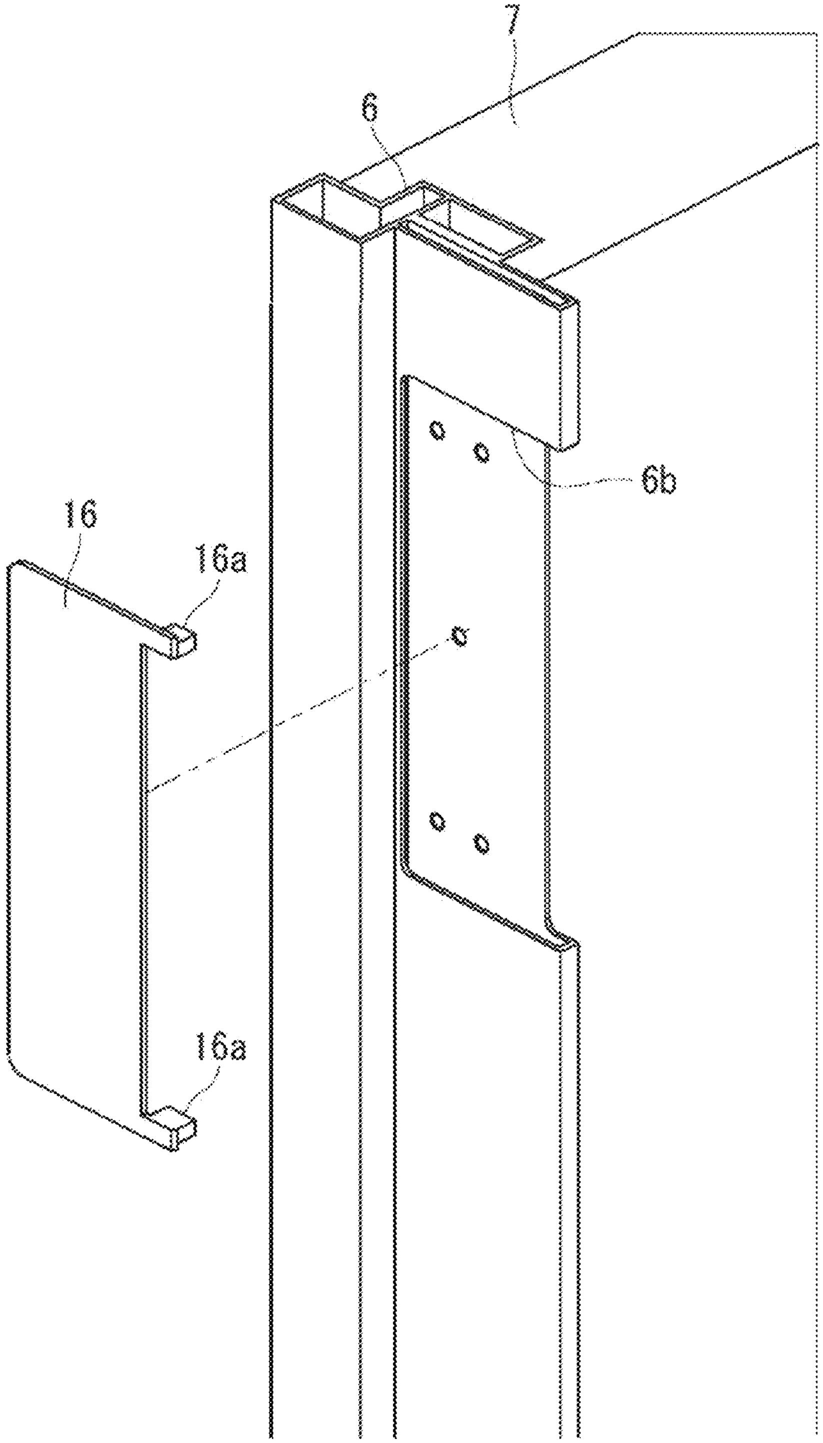
FIG. 6 is a perspective view of the side jamb and a cover of the hinge mounting structure.

As illustrated in FIG. 5, the cut portion 6*a* of the side jamb 6 includes a rectangular recessed portion 6*b* formed therein. The first piece 3 is mounted in the recessed portion 6*b*. A reference sign 15 denotes a screw hole into which a screw 17 (refer to FIG. 3) is screwed. A part 6*b*1 (a front end) of the recessed portion 6*b* penetrates the protruding portion 8 of the side jamb 6 in the left-and-right direction, which facilitates the placement of the shaft 2 (refer to FIG. 3) of the hinge 1 in the protruding portion 8. As illustrated in FIG. 6, the recessed portion 6*b* is covered with a cover 16 after the first piece 3 is mounted in the recessed portion 6*b*. Consequently, the appearance can be improved while the screw 17 is hidden. The cover 16 is detachably mounted on the side jamb 6 by use of a hook 16*a* of the cover 16. The frame of the embodiment is made of metal such as aluminum or sheet metal. However, the material of the side jamb 6 is not particularly limited. Moreover, the recessed portion 6*b* may be formed in the front surface of the protruding portion 8.

Figure 7:
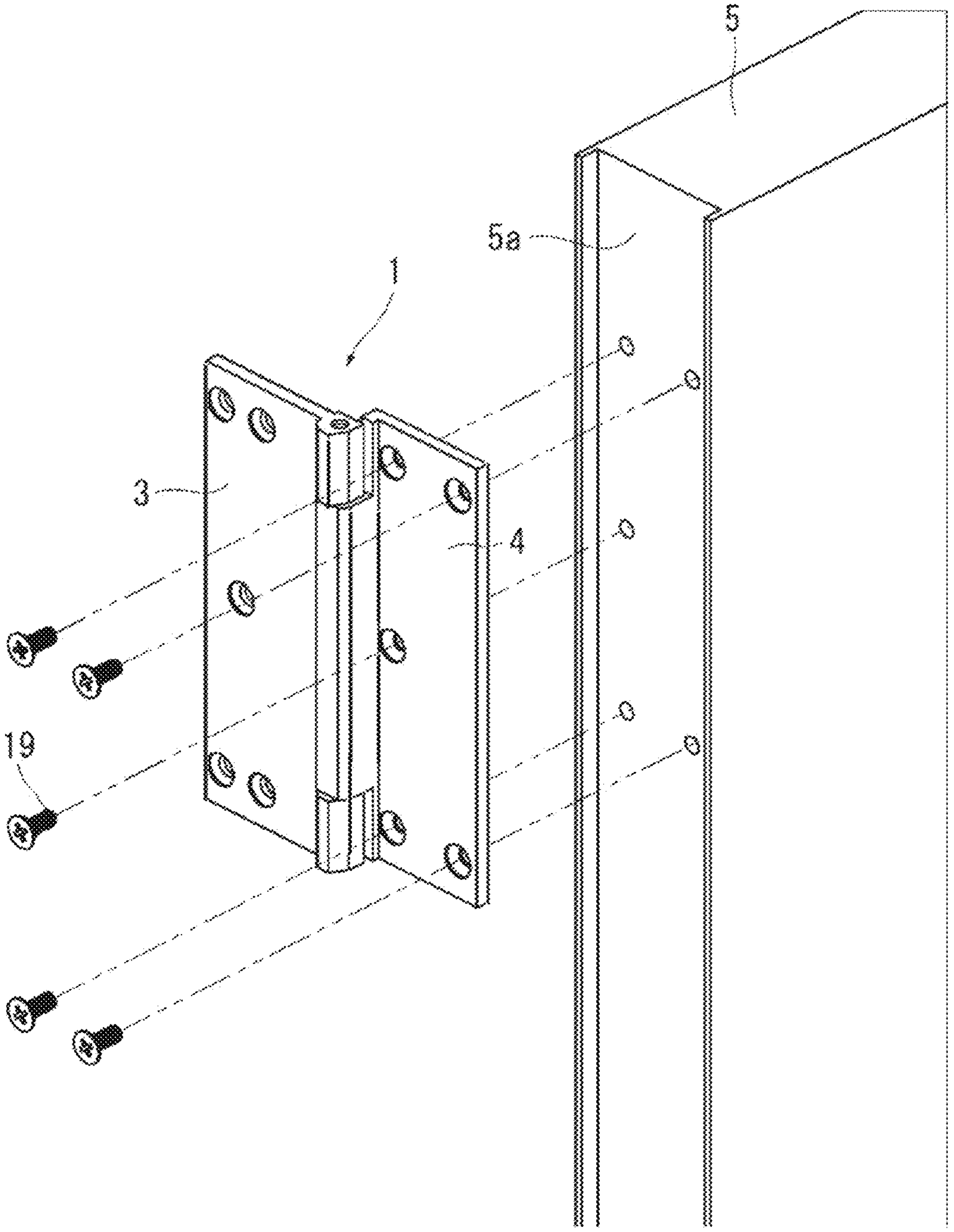
FIG. 7 is a perspective view of the hinge and the door of the hinge mounting structure.
Figure 8:
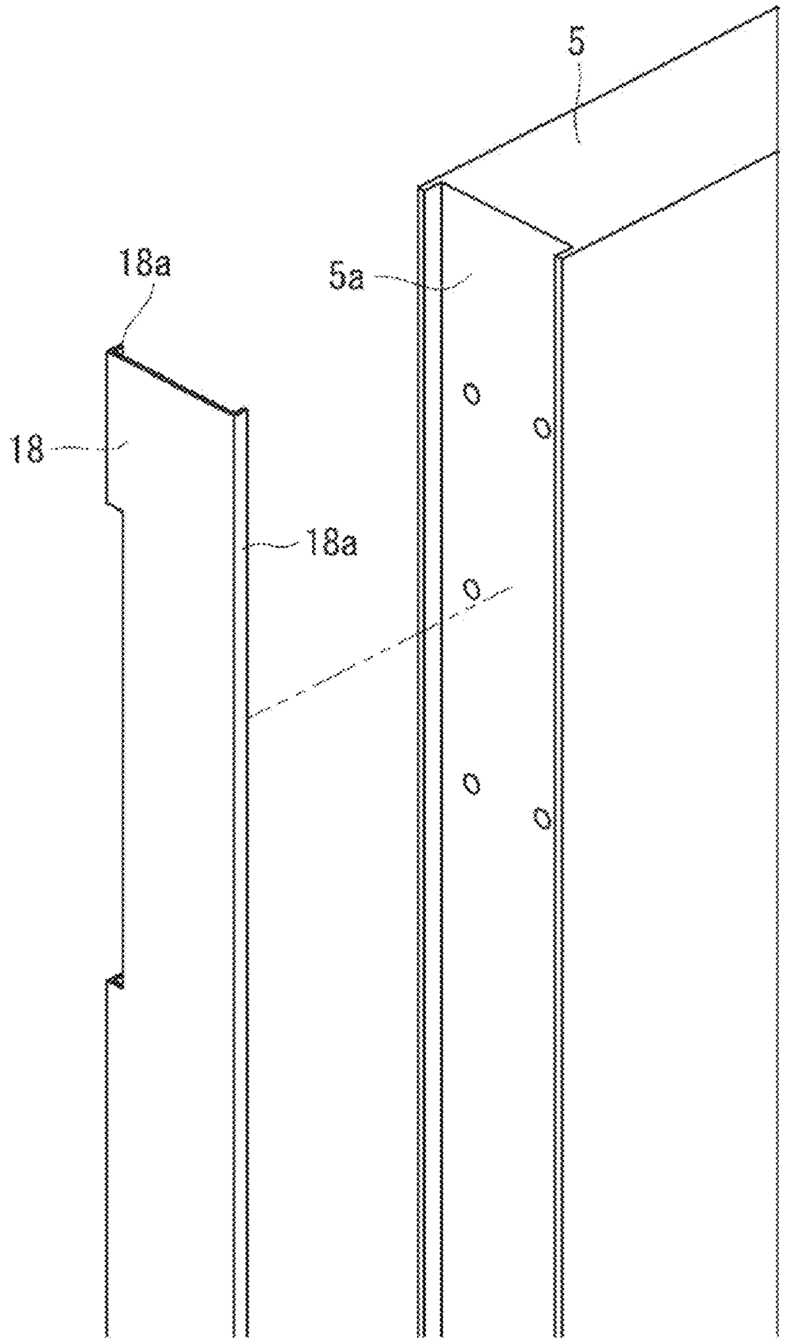
FIG. 8 is a perspective view of the door and the cover of the hinge mounting structure.

As illustrated in FIG. 7, a recessed portion 5*a* extending in the up-and-down direction is formed in the end face of the door 5. The second piece 4 is mounted in the recessed portion 5*a*. As illustrated in FIG. 8, the recessed portion 5*a* is covered with a cover 18 after the second piece 4 is mounted in the recessed portion 5*a*. Consequently, the appearance can be improved while a screw 19 (refer to FIG.

7) is hidden. The cover 18 is detachably mounted on the door 5 by use of a hook 18*a* of the cover 18.

Figure 9:
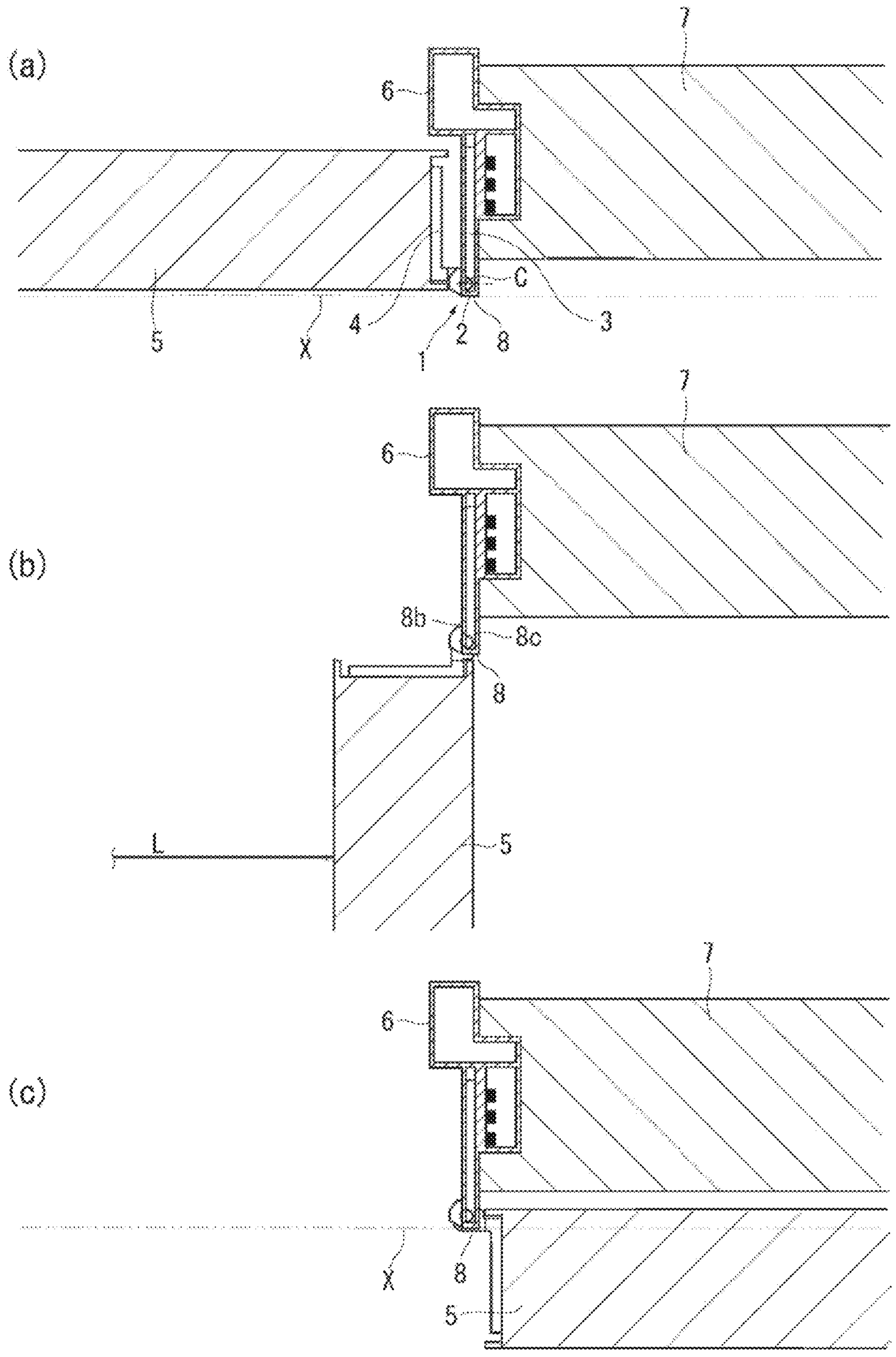
FIG. 9 is horizontal cross-sectional views of the hinge mounting structure (FIG. 9(*a*) illustrates the closed position of the door, FIG. 9(*b*) illustrates a 90-degree open position of the door, and FIG. 9(*c*) illustrates a 180-degree open position of the door).

FIG. 9 represents horizontal cross-sectional views of the hinge mounting structure of the embodiment. FIG. 9(*a*) illustrates the closed position of the door 5, FIG. 9(*b*) illustrates a 90-degree open position of the door 5, and FIG. 9(*c*) illustrates a 180-degree open position of the door 5. In the embodiment, a center C of the shaft 2 of the hinge 1 is placed backward of a front surface line X of the protruding portion 8 as illustrated in FIG. 9(*a*). Consequently, it is possible to make the hinge 1 inconspicuous, and to improve the appearance. Moreover, when the door 5 rotates from the open position to the closed position, going over the protruding portion 8, a gap between the door 5 and the protruding portion 8 can be reduced; therefore, for example, it is possible to prevent users from their fingers being caught in the gap.

As illustrated in FIG. 9(*a*), the door 5 in the closed position is backward of the front surface line X of the protruding portion 8. When the door 5 in the closed position illustrated in FIG. 9(*a*) rotates to the open positon, the door 5 goes over the protruding portion 8. At least a part of the door 5 is backward of the front surface line X of the protruding portion 8 in the open position of the door 5 as illustrated in FIG. 9(*c*). Consequently, the door 5 can open at a wide angle. The opening angle of the door 5 in the open position is not limited to 180 degrees, and can be any angle such as 190 degrees or 170 degrees.

The center C of the shaft 2 is placed between an inside surface 8*b* and an outside surface 8*c* of the protruding portion 8 as illustrated in FIG. 9(*b*). Consequently, an opening dimension L (refer also to FIG. 4) can be increased in the 90-degree open position of the door 5.

Figure 10:
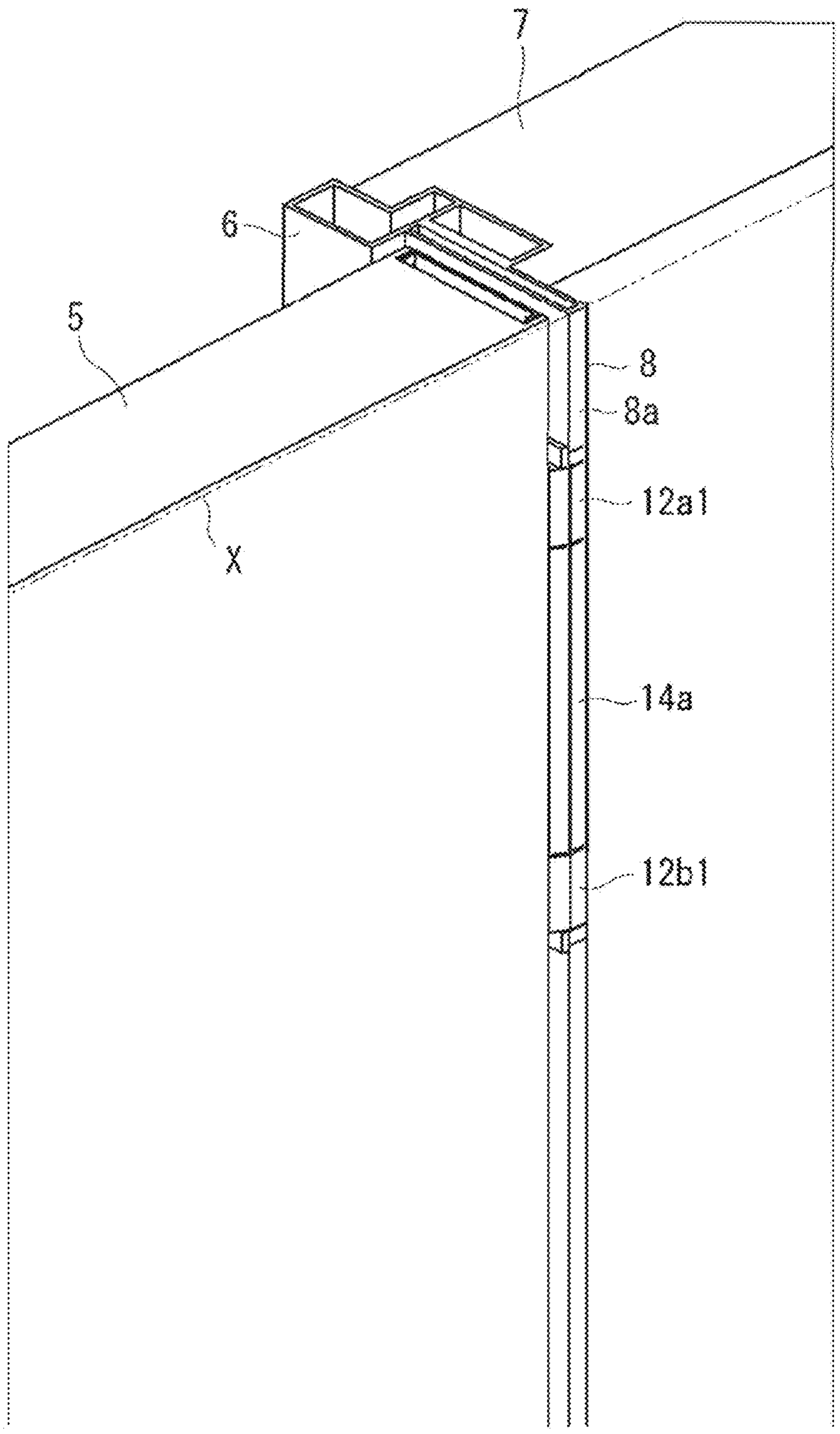
FIG. 10 a perspective view of the hinge mounting structure (a perspective view from the door side).
Figure 11:
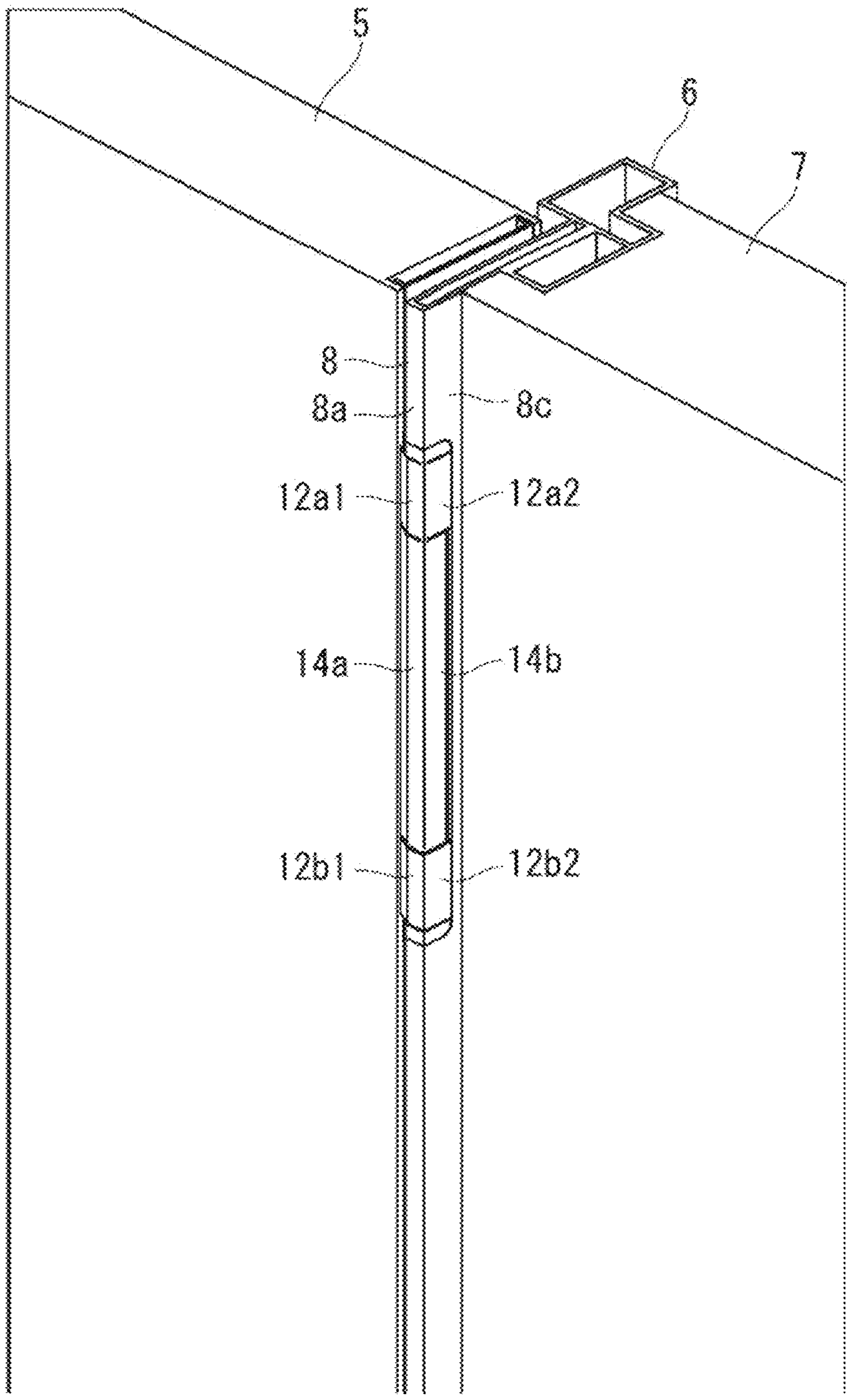
FIG. 11 is a perspective view of the hinge mounting structure (a perspective view from a wall side).

FIGS. 10 and 11 are perspective views of the hinge mounting structure of the embodiment (with the door 5 in the closed position). FIG. 10 is a perspective view from the door 5 side, and FIG. 11 is a perspective view from the wall side.

As illustrated in FIG. 10, front surfaces 12*a*1 and 12*b*1 of the tubular portions 12*a* and 12*b* of the first piece 3, and a front surface 14*a* of the tubular portion 14 of the second piece 4 are substantially in the same plane as a front surface 8*a* of the protruding portion 8, in the closed position of the door 5. As illustrated in FIG. 11, outside surfaces 12*a*2 and 12*b*2 of the tubular portions 12*a* and 12*b* of the first piece 3, and an outside surface 14*b* of the tubular portion 14 of the second piece 4 are substantially in the same plane as the outside surface 8*c* of the protruding portion 8, in the closed position of the door 5. Consequently, the appearance can be improved. The front surface 8*a* and the outside surface 8*c* of the protruding portion 8 are at right angles. The front surfaces 12*a*1 and 12*b*1 and the outside surfaces 12*a*2 and 12*b*2 of the tubular portions 12*a* and 12*b* of the first piece 3 are at right angles. The front surface 14*a* and the outside surface 14*b* of the tubular portion 14 of the second piece 4 are at right angles.

Each of the front surface 8*a* and the outside surface 8*c* of the protruding portion 8, the front surfaces 12*a*1 and 12*b*1 and the outside surfaces 12*a*2 and 12*b*2 of the tubular portions 12*a* and 12*b* of the first piece 3, and the front surface 14*a* and the outside surface 14*b* of the tubular portion 14 of the second piece 4 is formed into a flat surface, but may be formed into a curved surface of, for example, an arc shape in horizontal cross section.

Second Embodiment

Figure 12:
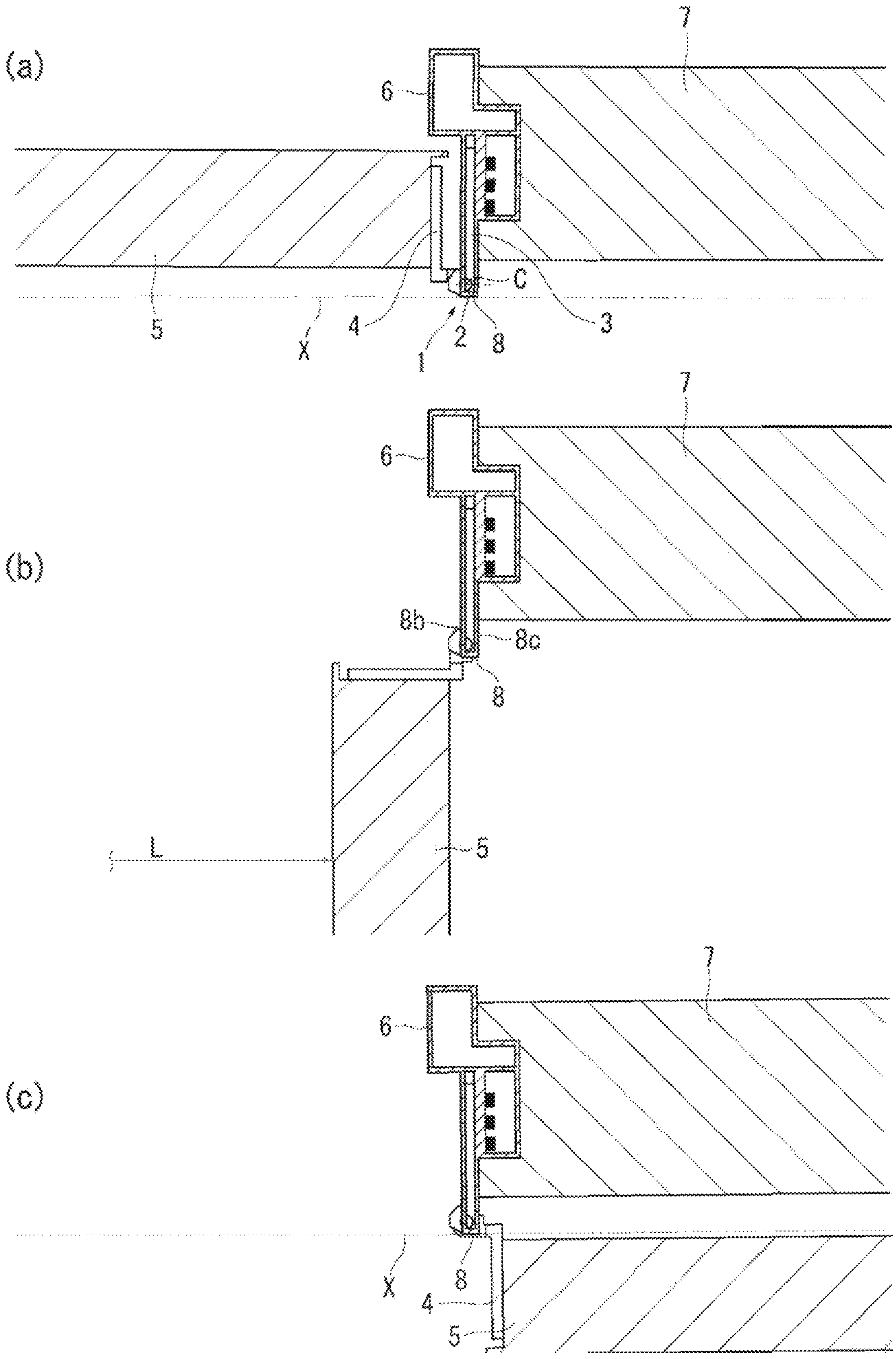
FIG. 12 is horizontal cross-sectional views of a hinge mounting structure of a second embodiment of the present invention (FIG. 12(*a*) illustrates a closed position of a door, FIG. 12(*b*) illustrates a 90 degree open position of the door, and FIG. 12(*c*) illustrates a 180-degree open position of the door).

FIG. 12 represents horizontal cross-sectional views of a hinge mounting structure of a second embodiment of the present invention. FIG. 12 illustrates a closed position of a door 5, FIG. 12(*b*) illustrates a 90-degree open position of the door 5, and FIG. 12(*c*) illustrates a 180-degree open position of the door 5. The configurations of a wall 7, a side jamb 6, and a hinge 1 are the same as those of the hinge mounting structure of the first embodiment. Therefore, the same reference signs are assigned thereto, and descriptions thereof are omitted.

As illustrated in FIG. 12(*a*), also in the hinge mounting structure of the second embodiment, the center C of the shaft 2 of the hinge 1 is placed backward of the front surface line X of the protruding portion 8 as in the hinge mounting structure of the first embodiment. Moreover, as illustrated in FIG. 12(*b*), the center C of the shaft 2 is placed between the inside surface 8*b* and the outside surface 8*c* of the protruding portion 8.

In the hinge mounting structure of the first embodiment, at least a part of the door 5 is backward of the front surface line X in the open position of the door 5. In contrast, in the hinge mounting structure of the second embodiment, the door 5 is forward of the front surface line X, but at least a part of the second piece 4 of the hinge 1 is backward of the front surface line X, in the open position of the door 5 as illustrated in FIG. 12(*c*).

The door 5 in the closed position is backward of the front surface line X of the protruding portion 8 as illustrated in FIG. 12(*a*). When the door 5 in the closed position illustrated in FIG. 12(*a*) rotates to the open position, the door 5 goes over the protruding portion 8. The part of the second piece 4 of the hinge 1 is backward of the front surface line X of the protruding portion 8 in the open position of the door 5 as illustrated in FIG. 12(*c*). Consequently, the door 5 can open at a wide angle. The opening angle of the door 5 in the open position is not limited to 180 degrees, and can be any angle such as 190 degrees or 170 degrees.

Third Embodiment

Figure 13:
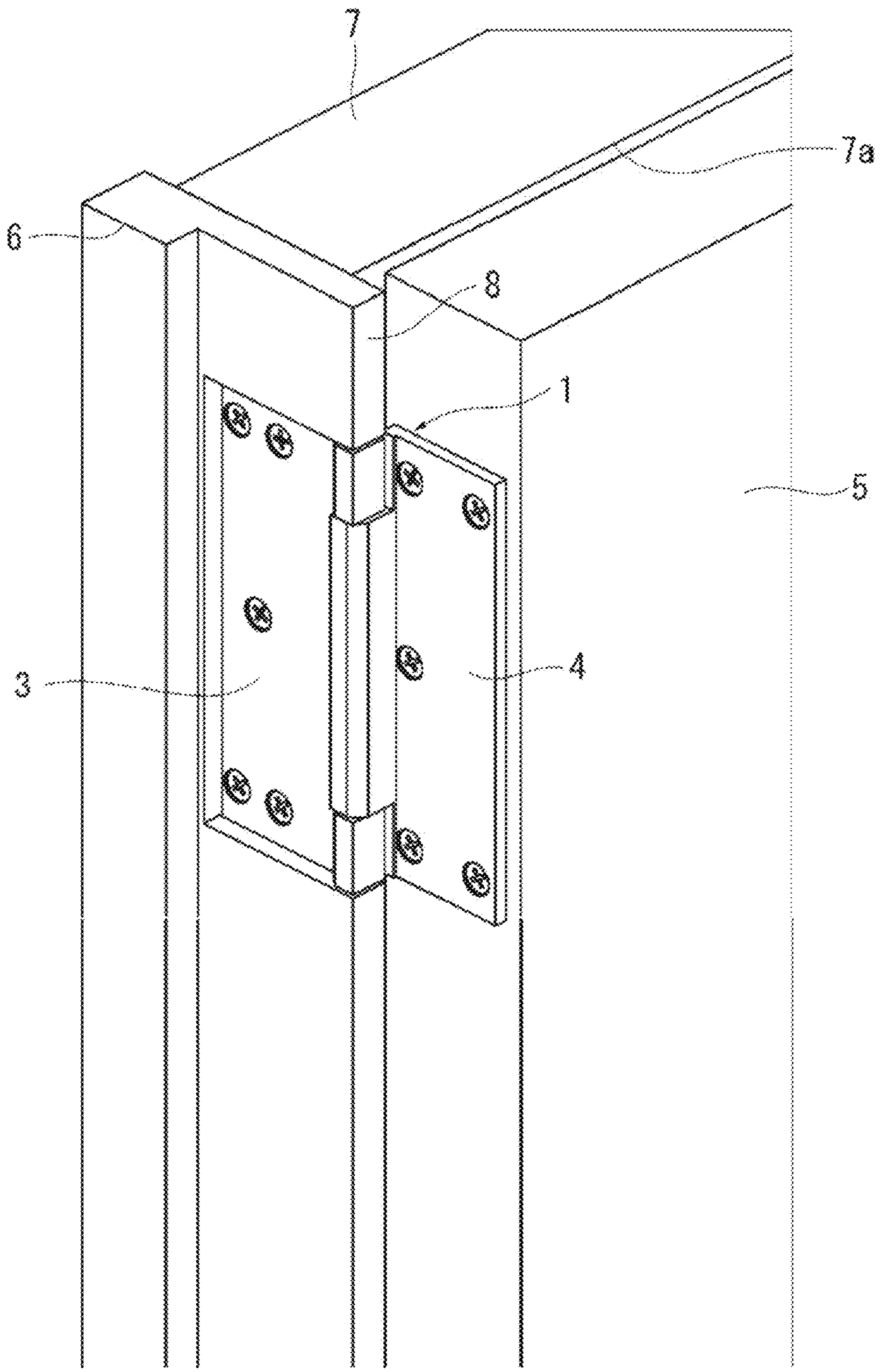
FIG. 13 is a perspective view of a hinge mounting structure of a third embodiment of the present invention (with a door in an open position).
Figure 14:
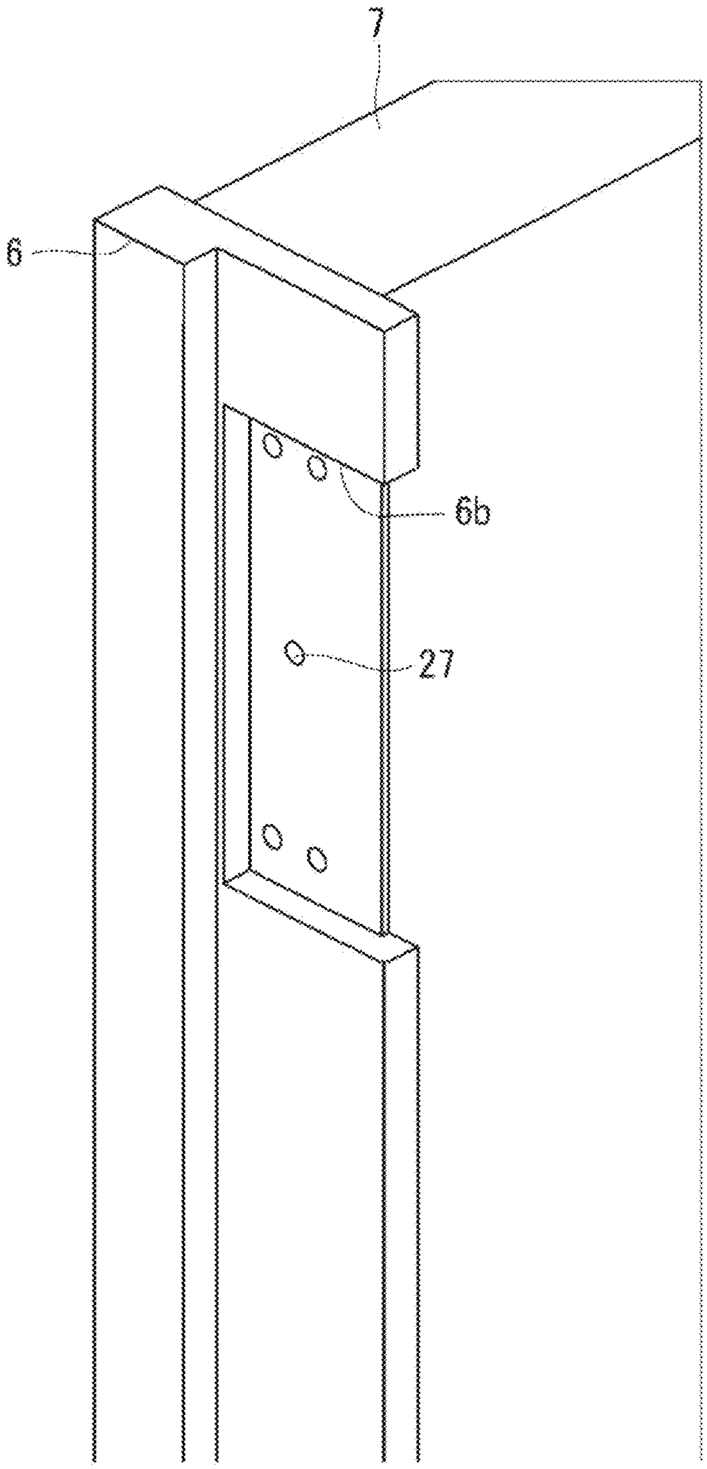
FIG. 14 is a perspective view of a side jamb of the hinge mounting structure.
Figure 15:
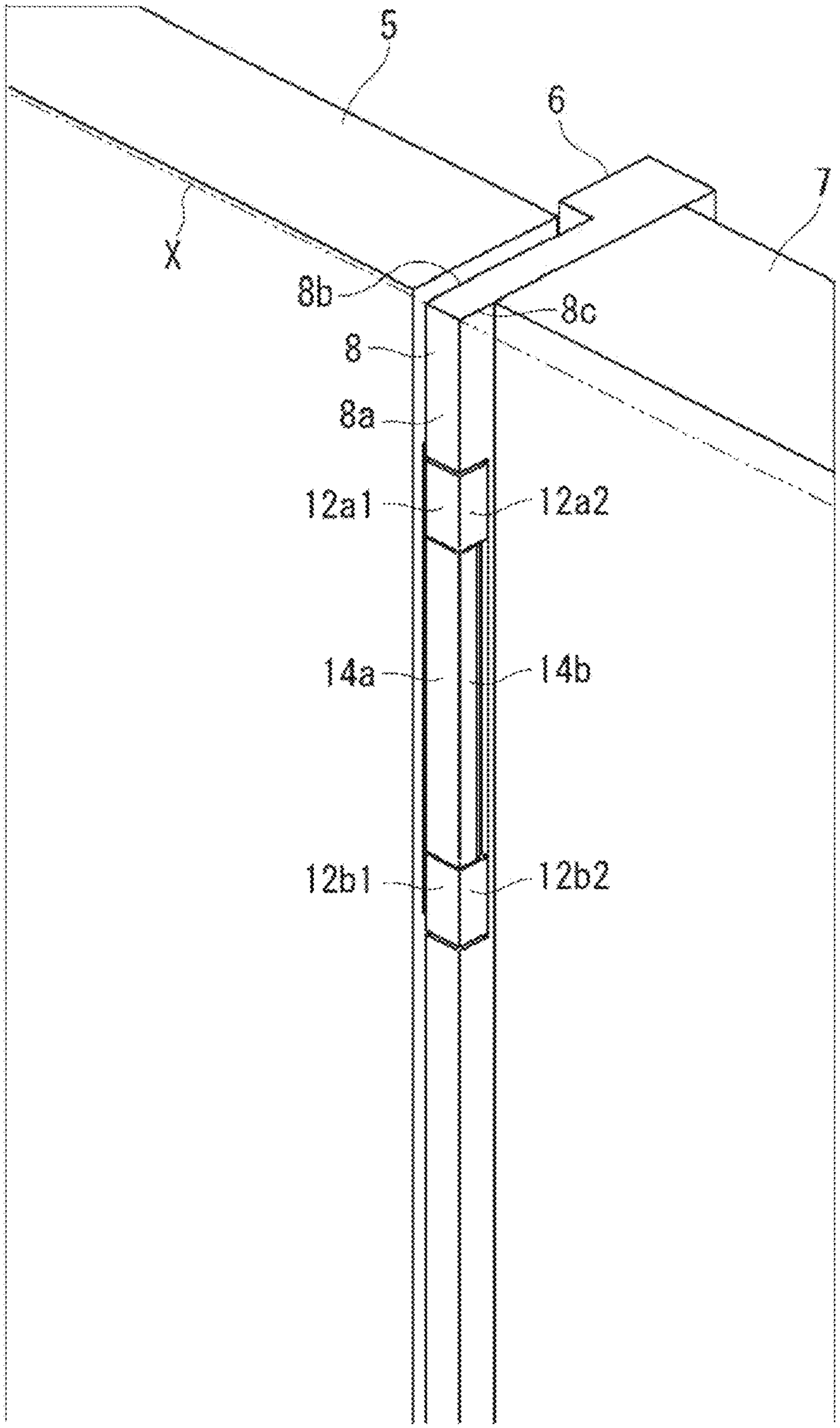
FIG. 15 is a perspective view of the hinge mounting structure (with the door in a closed position).

FIGS. 13 to 15 illustrate a hinge mounting structure of a third embodiment of the present invention. The side jamb 6 is made of metal in the first embodiment, whereas the side jamb 6 is made of wood in the third embodiment. The configuration of the hinge 1 is substantially the same as that of the hinge 1 of the first embodiment and therefore the same reference signs are assigned thereto, and descriptions thereof are omitted.

As illustrated in FIG. 13, the first piece 3 of the hinge 1 is mounted on the side jamb 6 with a screw. The second piece 4 of the hinge 1 is mounted on an end face of a door 5 with a screw. The side jamb 6 is provided with a protruding portion 8 protruding forward of a wall surface 7*a*. As illustrated in FIG. 14, the side jamb 6 includes a recessed portion 6*b* formed in an inside surface thereof. The first piece 3 is mounted in the recessed portion 6*b*. A reference sign 27 denotes a screw hole into which the screw is screwed.

FIG. 15 is a perspective view of the hinge mounting structure of the embodiment (with the door 5 in a closed position). The center C (refer to FIG. 9(*a*)) of the shaft 2 of the hinge 1 is placed backward of a front surface line X of the protruding portion 8 as in the first embodiment. Moreover, the center C of the shaft 2 of the hinge 1 is placed between an inside surface 8*b* and an outside surface 8*c* of the protruding portion 8. In the closed position of the door 5, the front surfaces 12*a*1 and 12*b*1 of the tubular portions 12*a* and 12*b* of the first piece 3, and the front surface 14*a* of the tubular portion 14 of the second piece 4 are substantially in the same plane as a front surface 8*a* of the protruding portion 8, and the outside surfaces 12*a*2 and 12*b*2 of the tubular portions 12*a* and 12*b* of the first piece 3, and the outside surface 14*b* of the tubular portion 14 of the second piece 4 are substantially in the same plane as the outside surface 8*c* of the protruding portion 8. The hinge mounting structure of the third embodiment exerts similar effects to the hinge mounting structure of the first embodiment.

Fourth Embodiment

Figure 16:
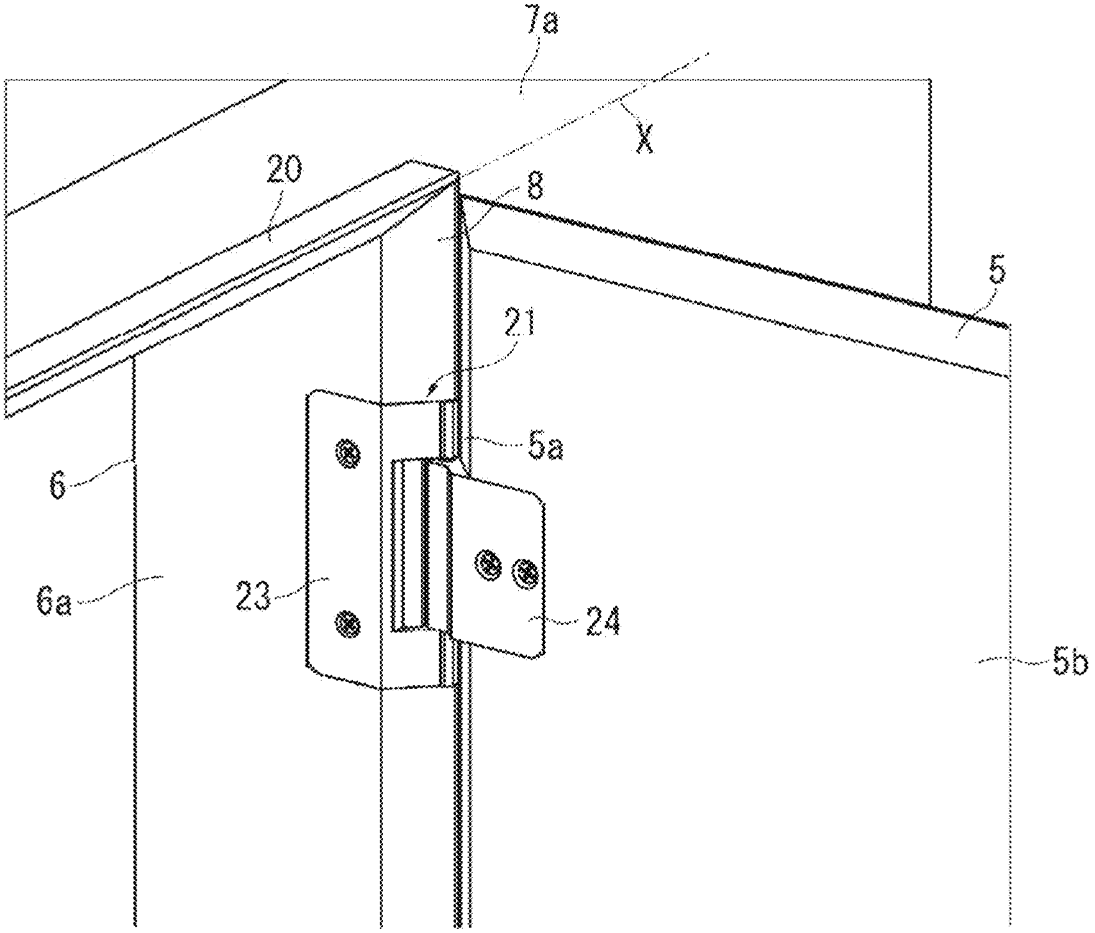
FIG. 16 is a perspective view of a hinge mounting structure of a fourth embodiment of the present invention.
Figure 19:
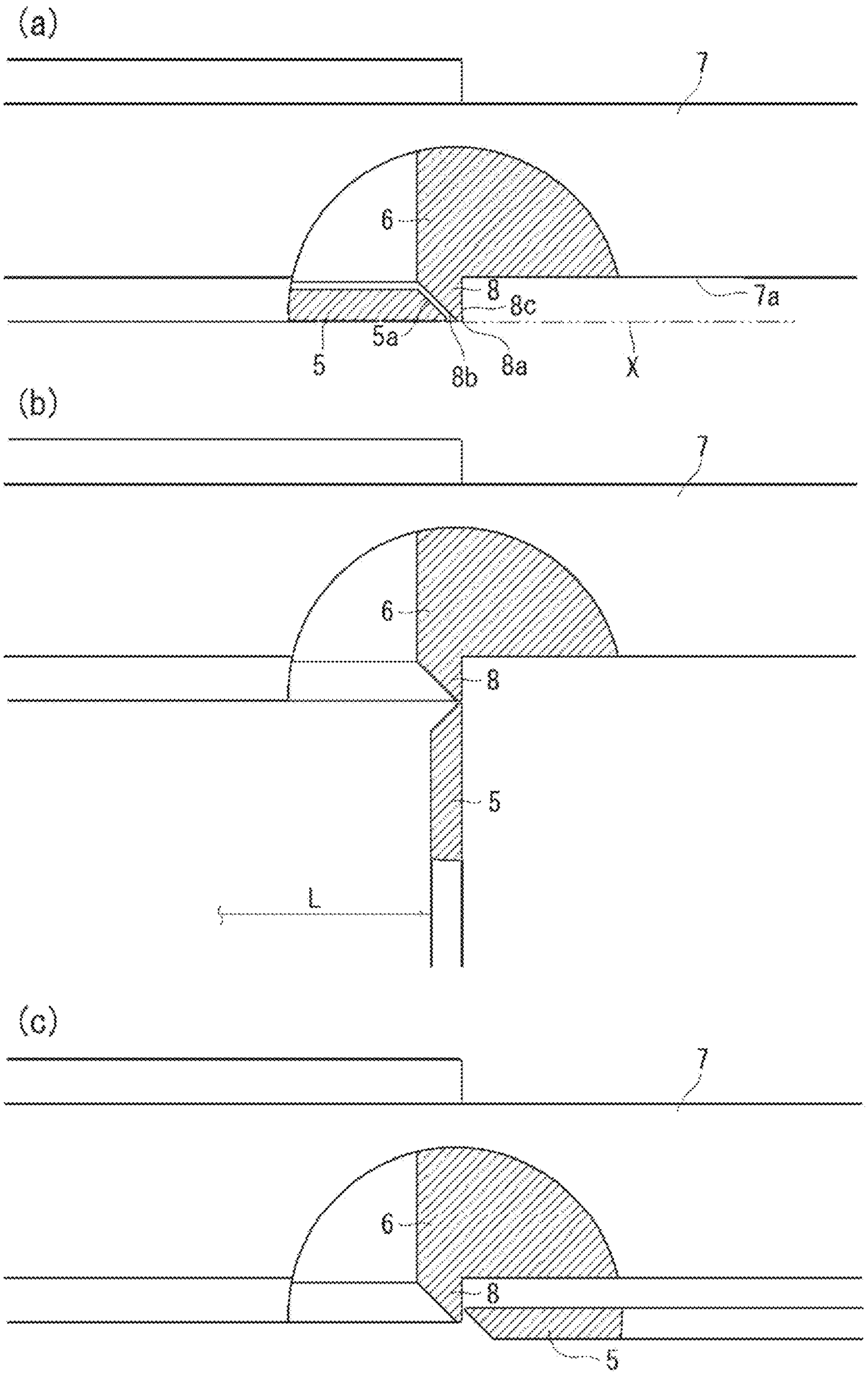
FIG. 19 is horizontal cross-sectional views of the hinge mounting structure (FIG. 19(*a*) illustrates a closed position of the door, FIG. 19(*b*) illustrates a 90-degree open position of the door, and FIG. 19(*c*) illustrates a 180-degree open position of the door).

FIG. 16 illustrates a hinge mounting structure of a fourth embodiment of the present invention. A reference sign 21 denotes a hinge, a reference sign 23 denotes a first piece of the hinge 21, a reference sign 24 denotes a second piece of the hinge 21, a reference sign 6 denotes a side jamb, a reference sign 20 denotes a head jamb, a reference sign 7*a* denotes a wall surface, and a reference sign 5 denotes a door. A protruding portion 8 of the side iamb 6, the protruding portion 8 protruding from the wall surface 7*a*, is formed in the shape of an approximate rectangle in horizontal cross section (refer to FIG. 4) in the first to third embodiments, whereas the protruding portion 8 of the side jamb 6, the protruding portion 8 protruding from the wall surface 7*a*, is formed in the shape of an approximate triangle in horizontal cross section (refer also to FIG. 19(*a*)) in the fourth embodiment. As illustrated in FIG. 19, an outside surface 8*c* of the protruding portion 8 is at right angles to the wall surface 7*a*. An inside surface 8*b* of the protruding portion 8 inclines with respect to the outside surface 8*c*. An end face (edge) of the door 5 inclines according to the inside surface 8*b* of the protruding portion 8. As illustrated in FIG. 16, the first piece 23 of the hinge 21 is mounted on the side jamb 6. The second piece 24 of the hinge 21 is mounted on an interior surface 5*b* of the door 5 along the end face of the door 5.

Figure 17:
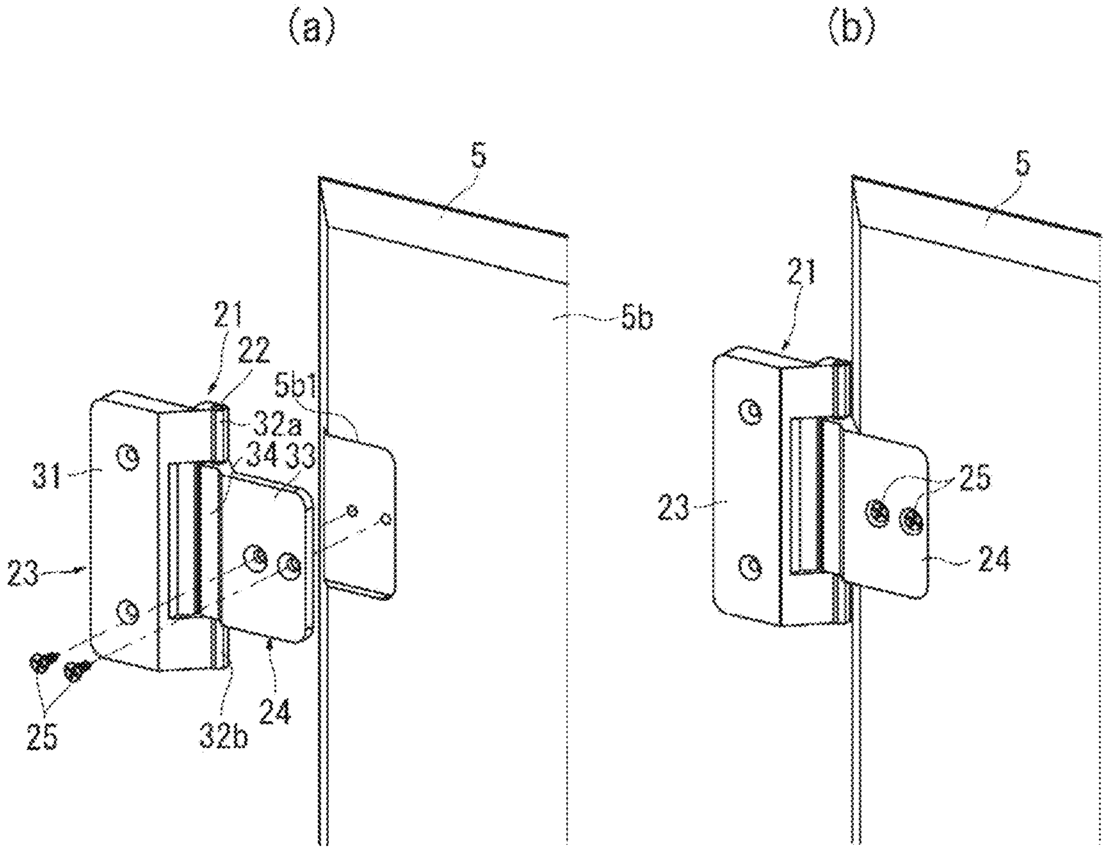
FIG. 17 is a perspective view of a hinge and a door of the hinge mounting structure.

As illustrated in FIG. 17(*a*), the hinge 21 includes a shaft 22, and the first piece 23 and the second piece 24 that are coupled together via the shaft 22 in such a manner as to be rotatable relative to each other. The first piece 23 includes an approximately rectangular main body portion 31, and tubular portions 32*a* and 32*b*. The second piece 24 includes an approximately rectangular main body portion 33 and a tubular portion 34. The tubular portion 34 of the second piece 24 is placed between the tubular portions 32*a* and 32*b* of the first piece 23. The shaft 22 is inserted into the tubular portions 32*a* and 32*b* of the first piece 23, and the tubular portion 34 of the second piece 24. The first piece 23 and the second piece 24 have, for example, an approximate L-shape in plan view.

As illustrated in FIG. 17(*a*), an approximately rectangular recessed portion. 5*b*1 is formed in the interior surface 5*b* of the door 5. As illustrated in FIG. 17(*b*), the second piece 24 is mounted in the recessed portion 5*a* with a screw 25.

Figure 18:
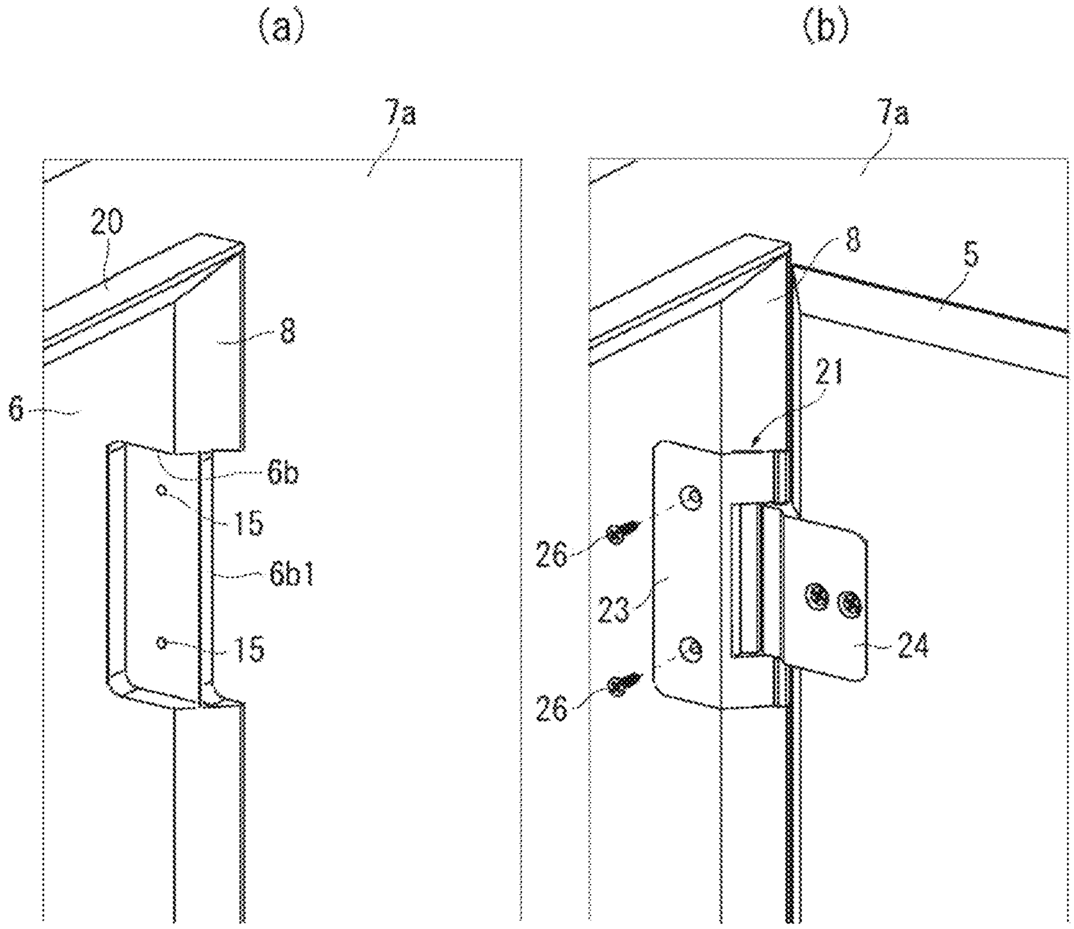
FIG. 18 is perspective views of a side jamb and the door of the hinge mounting structure.

As illustrated in FIG. 18(*a*), a rectangular recessed portion 6*b* is formed in the side jamb 6. A part 6*b*1 (front end) of the recessed portion 6*b* penetrates the protruding portion 8 of the side jamb in the left-and-right direction. As illustrated in FIG. 18(*b*), the first piece 23 is mounted in the recessed portion 6*b* of the side jamb 6 with a screw 26 after the door 5 is mounted on the second piece 24. A reference sign 15 denotes a screw hole into which the screw 26 is screwed.

Figure 20:
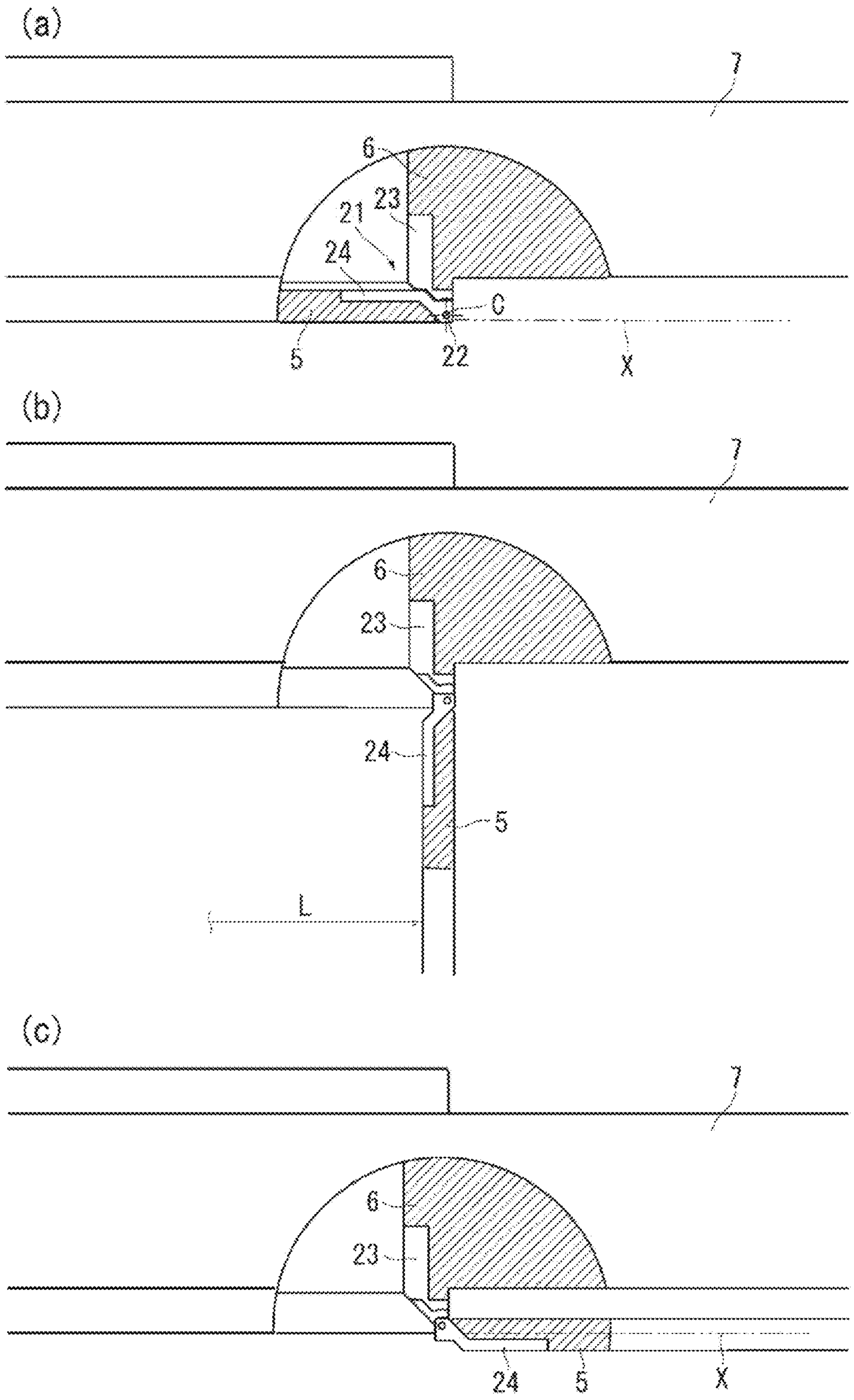
FIG. 20 is horizontal cross-sectional views of the hinge mounting structure (FIG. 20(*a*) illustrates the closed position of the door, FIG. 20(*b*) illustrates the 90-degree open position of the door, and FIG. 20(*c*) illustrates the 180-degree open position of the door).

FIG. 19 represents plan views of the hinge mounting structure of the embodiment (partially including horizontal cross-sectional views of the side jamb 6 and the door 5). FIG. 19(*a*) illustrates a closed position of the door 5, FIG. 19(*b*) illustrates a 90-degree open position of the door 5, and FIG. 19(*c*) illustrates a 180-degree open position of the door 5. FIG. 20 represents plan views of the hinge mounting structure of the embodiment (partially including horizontal cross-sectional views of the side jamb 6 and the door 5 at the height of the hinge 21) as in FIG. 19.

Figure 21:
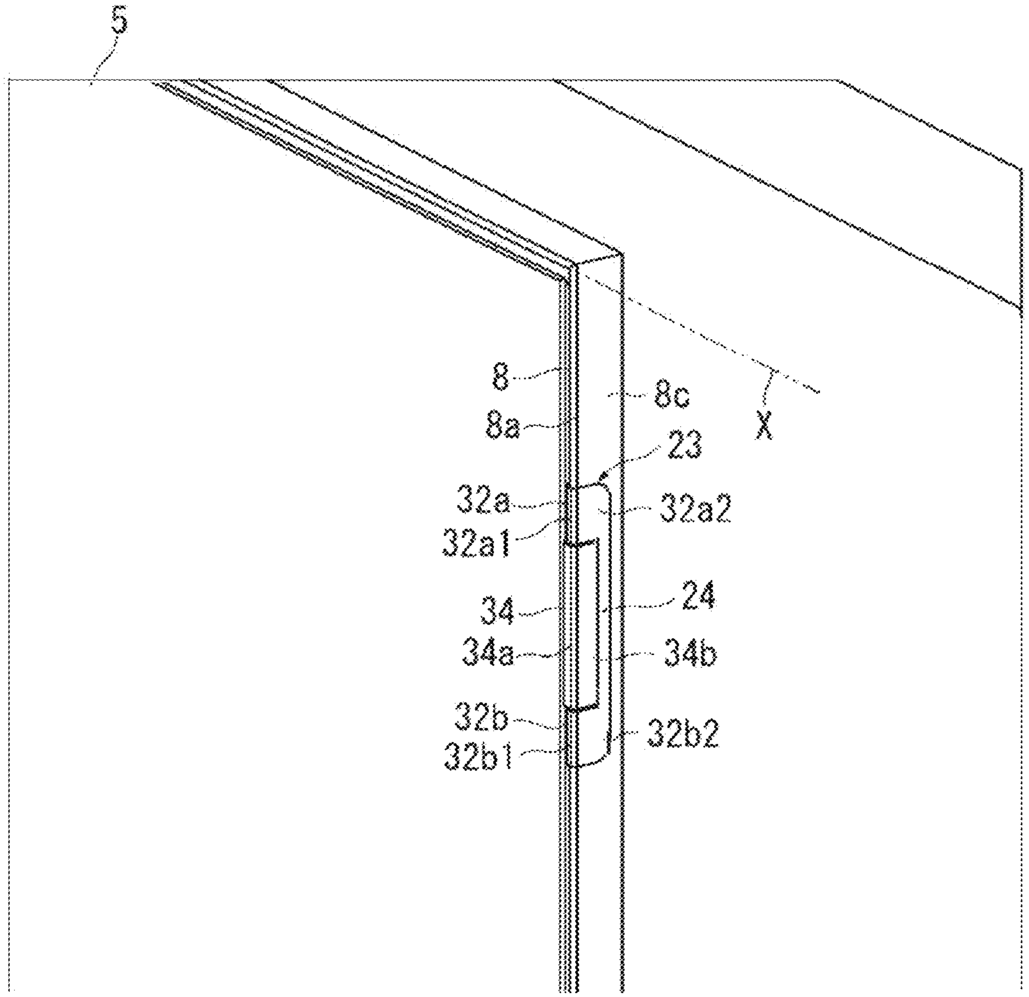
FIG. 21 is a perspective view of the hinge mounting structure.

As illustrated in FIG. 20(*a*), a center C of the shaft 22 of the hinge 21 is placed backward of a front surface line X of the protruding portion 8 (refer to FIG. 19(*a*)). Consequently, the hinge 21 can be made inconspicuous as illustrated in FIG. 21. Moreover, when the door 5 rotates from the open position to the closed position, going over the protruding portion 8, as illustrated in FIG. 19, a gap between the door 5 and the protruding portion 8 can be reduced; therefore, for example, it is possible to prevent users from their fingers being caught in the gap.

As illustrated in FIG. 20(*a*), the door 5 in the closed position is backward of the front surface line X of the protruding portion 8. As illustrated in FIG. 20(*c*), at least a part of the door 5 and at least a part of the second piece 24 are backward of the front surface line X of the protruding portion 8, in the open position of the door 5. Consequently, the door 5 can open at a wide angle.

As illustrated in FIG. 20(*a*), the center C of the shaft 22 is placed between the inside surface 8*b* and the outside surface 8*c* (refer to FIG. 19(*a*)) of the protruding portion 8. Consequently, an opening dimension L can be increased in the 90-degree open position of the door 5.

FIG. 21 is a perspective view of the hinge mounting structure of the embodiment (with the door 5 in the closed position). In the closed position of the door 5, front surfaces 32*a*1 and 32*b*1 of the tubular portions 32*a* and 32*b* of the first piece 23, and a front surface 34*a* of the tubular portion 34 of the second piece 24 are substantially in the same plane as the front surface line X of the protruding portion 8. Moreover, in the closed position of the door 5, outside surfaces 32*a*2 and 32*b*2 of the tubular portions 32*a* and 32*b* of the first piece 23, and an outside surface 34*b* of the tubular portion 34 of the second piece 24 are substantially in the same plane as the outside surface 8*c* of the protruding portion 8. Consequently, the appearance can be improved.

As illustrated in FIG. 19(*a*), a front surface 8*a* of the protruding portion 8 is formed in the shape of, for example, an arc in horizontal cross section in the embodiment, but may be formed into a flat surface. The hinge mounting structure of the fourth embodiment exerts similar effects to the hinge mounting structure of the first embodiment.

Fifth Embodiment

Figure 22:
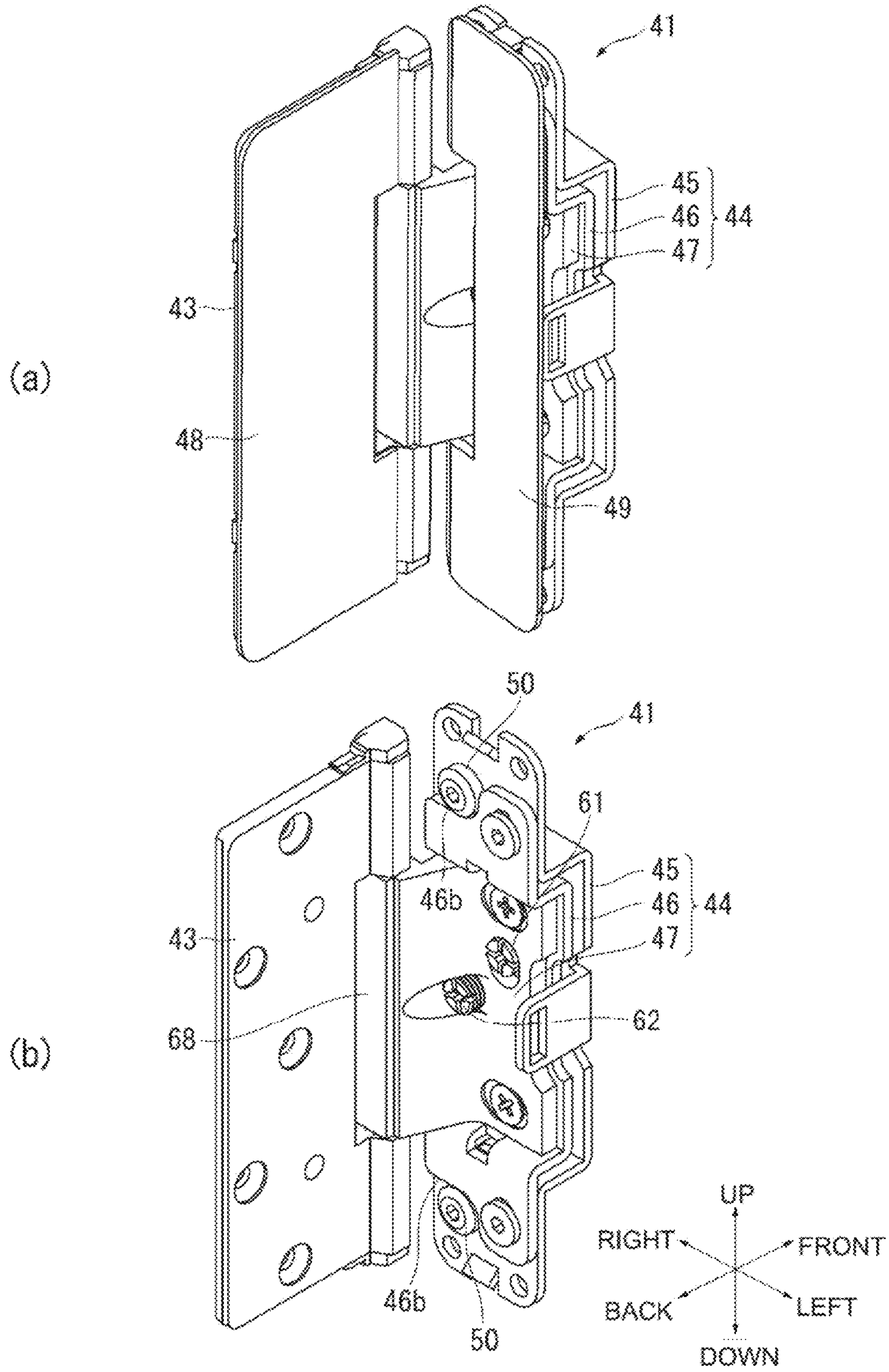
FIG. 22 are perspective views of a hinge that is used in a hinge mounting structure of a fifth embodiment of the present invention.

FIG. 22 illustrates a hinge 41 that is used in a hinge mounting structure of a fifth embodiment of the present invention. FIG. 22(*a*) illustrates a state with covers 48 and 49 mounted on a first piece 43 and a second piece 44 of the hinge 41, and FIG. 22(*b*) illustrates a state with the covers 48 and 49 removed from the first piece 43 and the second piece 44.

The hinge 41 of the fifth embodiment includes a shaft 42 (refer to FIG. 23), and the first piece 43 and the second piece 44 that are coupled together via the shaft 42 in such a manner as to be rotatable relative to each other, as in the hinge 1 of the first embodiment. The first piece 43 is mounted on a side jamb 6 as in the hinge 1 of the first embodiment. The second piece 44 is mounted on an end face of a door 5. The hinge 41 illustrated in FIGS. 22 and 23 is in a 90-degree open position.

As illustrated in FIG. 22(*b*), the second piece 44 of the hinge 41 includes a mounting plate 45 that is mounted on the door 5, a second piece body 47 provided with a tubular portion 68 into which the shaft 42 is inserted, and a middle plate 46 placed between the mounting plate 45 and the second piece body 47. The second piece 44 is provided with eccentric cams 50 as up-and-down adjustment portions, an eccentric cam 61 as a fore-and-aft adjustment portion, and a left-and-right adjustment screw 62 as a left-and-right adjustment portion. They are rotated to enable adjustments to the position of the door 5 in the closed position in the up-and-down direction, the left-and-right direction, and the front-and-back direction.

The up-and-down, left-and-right, and front-and-back directions of the door 5 are the directions in a front view from the opening side of the door 5 in the closed position, that is, the up-and-down, left-and-right, and front-and-back directions in FIGS. 22(*b*) and 23.

Figure 23:
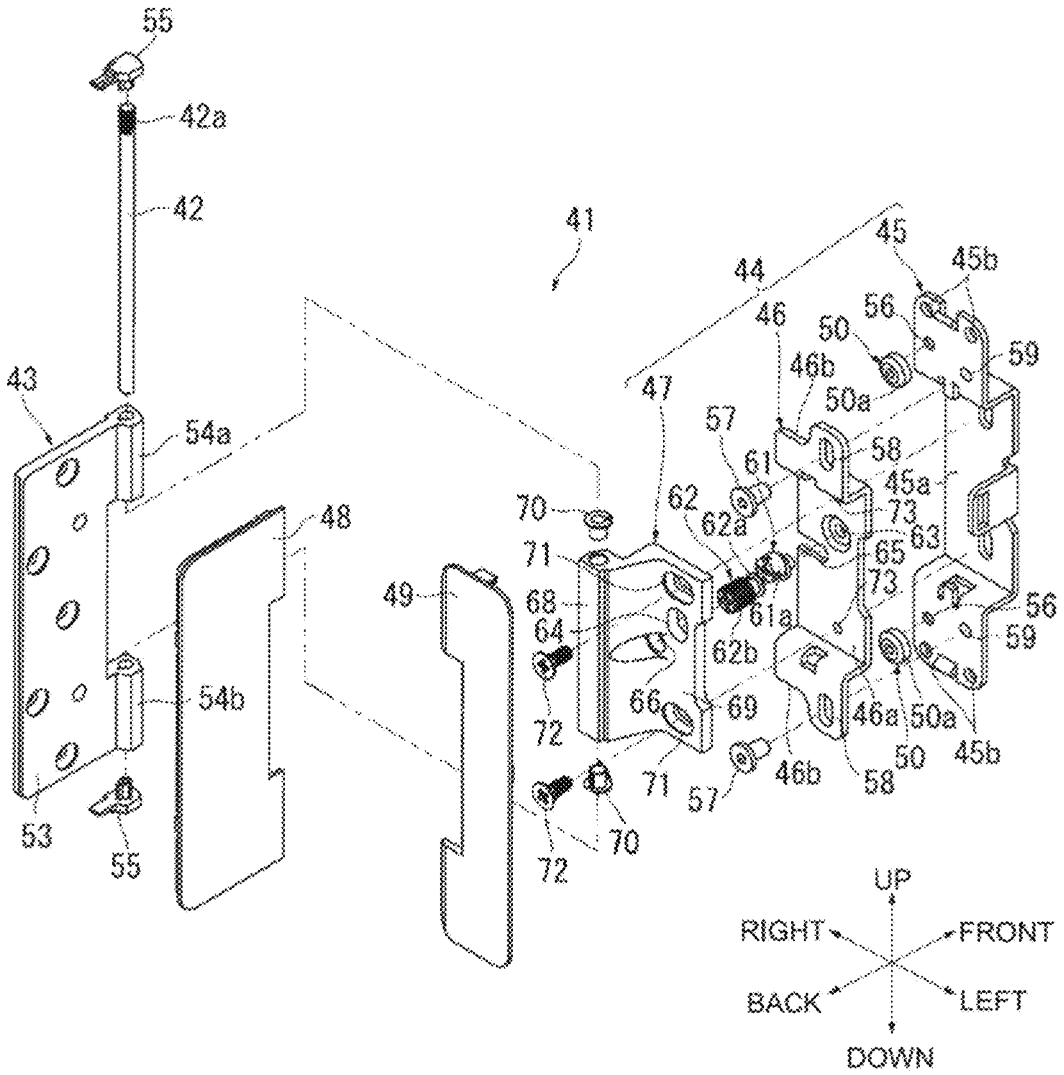
FIG. 23 is an exploded perspective view of the hinge.

FIG. 23 represents an exploded perspective view of the hinge 41. The first piece 43 includes an approximately rectangular main body portion 53, and tubular portions 54*a* and 54*b*. The shaft 42 is inserted into the tubular portions 54*a* and 54*b*. A serration 42*a* for locking in rotation is formed at an end of the shaft 42. A cap 55 for concealing the end of the shaft 42 is mounted on each of the tubular portions 54*a* and 54*b*.

The reference sign 45 denotes the mounting plate, the reference sign 46 denotes the middle plate, and the reference sign 47 denotes the second piece body. The mounting plate 45 is bent to form a recessed portion 45*a* in a central part thereof. A through-hole 45*b* through which a screw (not illustrated) for mounting the mounting plate 45 on the door 5 runs is formed in the mounting plate 45.

Figure 24:
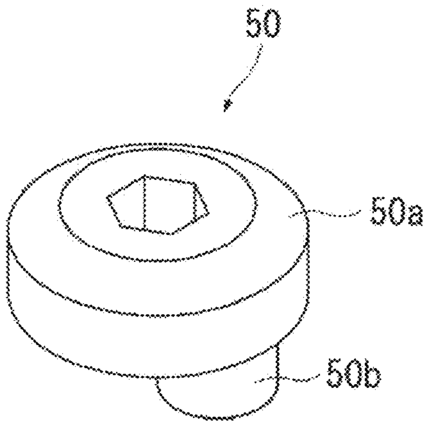
FIG. 24(*a*) is a perspective view of as eccentric cam as an up-and-down adjustment portion of the hinge, and FIG. 24(*b*) is a perspective view of an eccentric cam as a fore-and-aft adjustment portion of the hinge.
Figure 24:
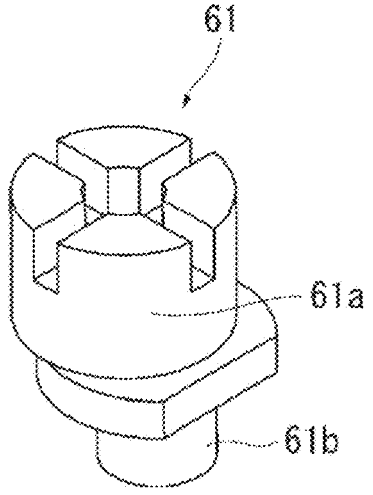

The eccentric cams 50 as the up-and-down adjustment portions are rotatably mounted on the mounting plate 45. As illustrated in FIG. 24(*a*), each of the eccentric cams 50 includes a shaft portion 50*b*, and a head portion 50*a* that is offset from the shaft portion 50*b*. As illustrated in FIG. 23, each of the shaft portions 50*b* is inserted into a respective through-hole 56 in the mounting plate 45, and is riveted; therefore, the eccentric cams 50 can be rotatably mounted on the mounting plate 45. The head portions 50*a* of the eccentric cams 50 touch an upper and a lower end 46*b* of the middle plate 46. When the eccentric cams 50 are rotated, the position in the up-and-down direction of the mounting plate 45 relative to the middle plate 46 can be adjusted.

The middle plate 46 is bent to form a recessed portion 46*a* in a central part thereof as in the mounting plate 45. A long hole 58 extending in the up-and-down direction through which a screw 57 for securing the middle plate 46 to the mounting plate 45 runs is formed in the middle plate 46. The screw 57 is threadedly engaged in a screw hole 59 in the mounting plate 45.

The eccentric cam 61 as the fore-and-aft adjustment portion is rotatably mounted on the middle plate 46. As illustrated in FIG. 24(*b*), the eccentric cam 61 includes a shaft portion 61*b*, and a head portion 61*a* that is offset from the shaft portion 61*b*. As illustrated in FIG. 23, the shaft portion 61*b* is inserted into a through-hole 63 in the middle plate 46, and is riveted; therefore, the eccentric cam 61 can be rotatably mounted on the middle plate 46. The head portion 61*a* of the eccentric cam 61 is fitted into a long hole 64 in the second piece body 47 described below. When the eccentric cam 61 is rotated, the position in the left-and-right direction (the left-and-right direction in the drawing) of the middle plate 46 relative to the second piece body 47 can be adjusted.

A long hole 65 extending in the left-and-right direction (the left-and-right direction in the drawing) is formed in the middle plate 46. The long hole 65 is open at one end. The left-and-right adjustment screw 62 as the left-and-right adjustment portion is rotatably mounted on the middle plate 46. A small-diameter portion 62*a* is formed on the left-and-right adjustment screw 62. The small-diameter portion 62*a* is inserted into the long hole 65 from the open end to rotatably mount the left-and-right adjustment screw 62 on the middle plate 46. A large-diameter thread portion 62*b* of the left-and-right adjustment screw 62 is threadedly engaged in a screw hole 66 in the second piece body 47. When the left-and-right adjustment screw 62 is rotated, the position in the front-and-back direction (the front-and-back direction in the drawing) of the middle plate 46 relative to the second piece body 47 can be adjusted.

The second piece body 47 includes an approximately L-shaped main body portion 69 that is fitted into the recessed portion 46*a* of the middle plate 46, and a tubular portion 68. The shaft 42 is inserted into the tubular portion 68. A collar 70 that prevents contact between the first piece 43 and the second piece body 47 is mounted on the tubular portion 68.

A long hole 71 extending in the left-and-right direction (the left-and-right direction in the drawing) is formed in the second piece body 47. A screw 72 for securing the second piece body 47 to the middle plate 46 runs through the long hole 71. A screw hole 73 that is threadedly engaged with the screw 72 is formed in the middle plate 46.

The screw hole 66 that is threadedly engaged with the left-and-right adjustment screw 62 is formed in the second piece body 47. When the second piece body 47 is assembled to the middle plate 46, the left-and-right adjustment screw 62 is threadedly engaged with the second piece body 47, and then the small-diameter portion 62*a* of the left-and-right adjustment screw 62 is inserted into the long hole 65 of the middle plate 46. The middle plate 46 is then slid to the right relative to the second piece body 47 to cause the head portion 61*a* of the eccentric cam 61 to fit into the long hole 64 of the second piece body 47.

Figure 25:
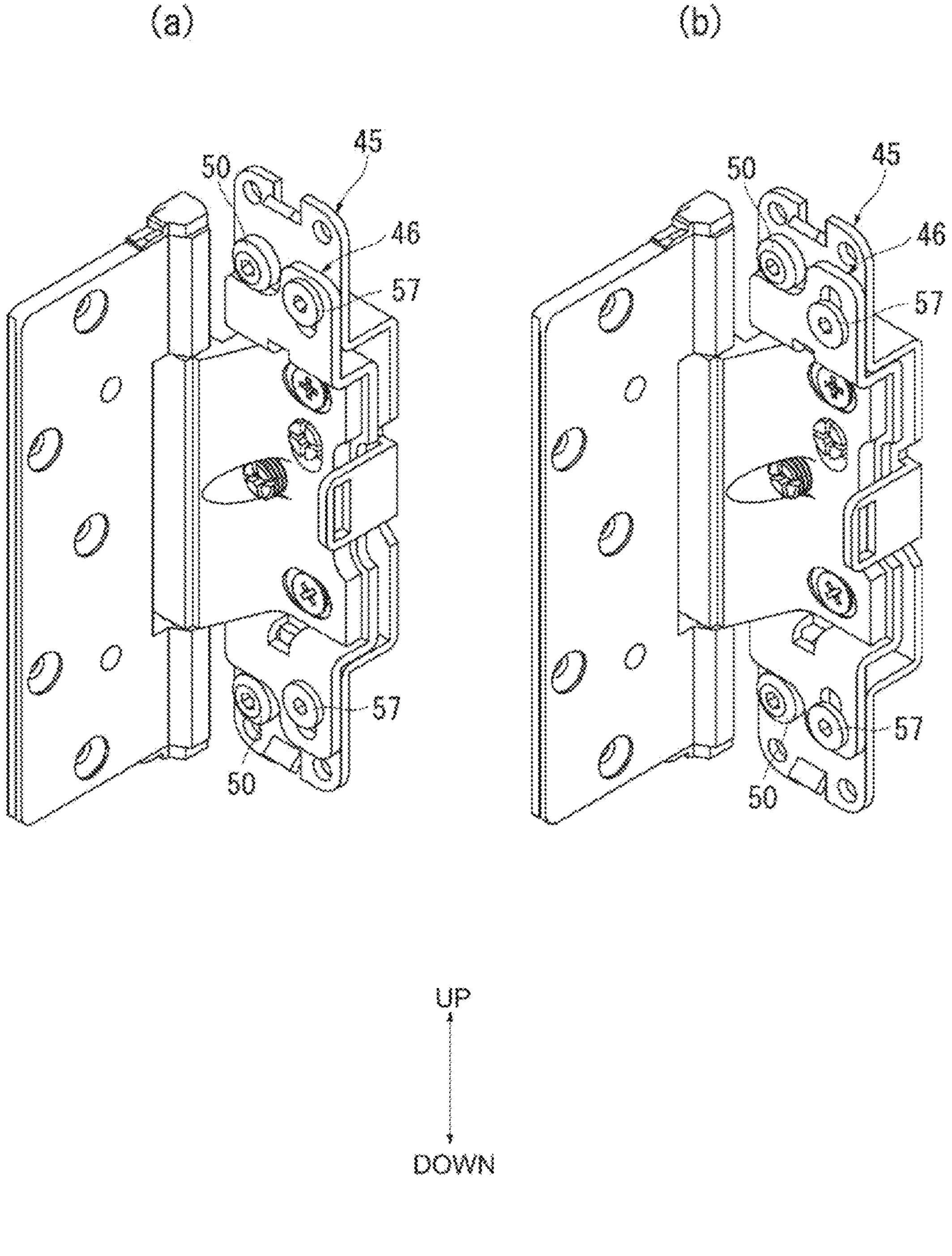
FIG. 25 is perspective views illustrating the adjustment of the position in the up-and-down direction of a door in a closed position (FIG. 25(*a*) illustrates the top-end position of a mounting plate, and FIG. 25(*b*) illustrates the bottom-end position of the mounting plate).

The position of the door 5 is adjusted as follows: FIG. 25(*a*) illustrates a state where the mounting plate 45 has been adjusted to the top-end position relative to the middle plate 46, and FIG. 25(*b*) illustrates a state in the bottom-end position after adjustment. As illustrated in FIGS. 25(*a*) and 25(*b*), in order to adjust the position in the up-and-down direction of the door 5, the screw 57 is loosened to make the mounting plate 45 movable in the up-and-down direction relative to the middle plate 46, and then the eccentric cams 50 are rotated (in other words, the head portions 50*a* of the eccentric cams 50 are rotated off-center) to adjust the position of the mounting plate 45 in the up-and-down direction relative to the middle plate 46. After the position adjustment, the screw 57 is tightened to secure the mounting plate 45 to the middle plate 46.

Figure 26:
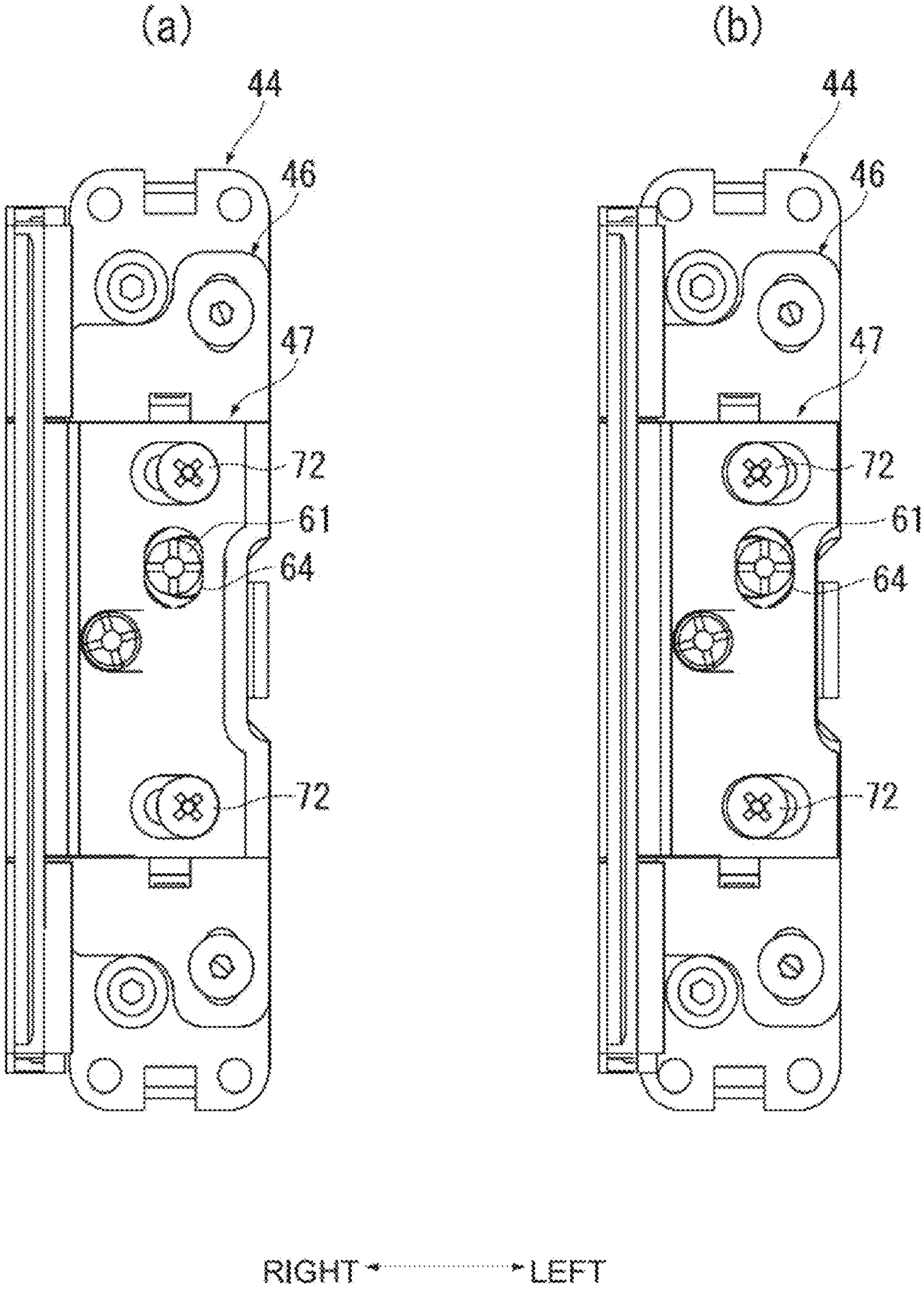
FIG. 26 is diagrams illustrating the adjustment of the position in the front-and-back direction (the left-and-right direction in FIG. 26) of the door in the closed position (FIG. 26(*a*) illustrates the left-end position of a middle plate, and FIG. 26(*b*) illustrates the right-end position of the middle plate).

FIG. 26(*a*) illustrates a state where the middle plate 46 has been adjusted to the left-end position (the left-end position of when the second piece 44 is in the 90-degree open position) relative to the second piece body 47, and FIG. 26(*b*) illustrates a state in the right-end position after adjustment. As illustrated in FIGS. 26(*a*) and 26(*b*), in order to adjust the position in the front-and-back direction of the door 5, the screw 72 is loosened to make the middle plate 46 movable in the left-and-right direction (the left-and-right direction in the drawing) relative to the second piece body 47, and then the eccentric cam 61 is rotated (in other words, the head portion 61*a* of the eccentric cam 61 is rotated off-center, being slid up and down in the long hole 64 of the second piece body 47) to adjust the position of the middle plate 46 in the left-and-right direction (the left-and-right direction in the drawing) relative to the second piece body 47. After the position adjustment, the screw 72 is tightened to secure the second piece body 47 to the middle plate 46.

Figure 27:
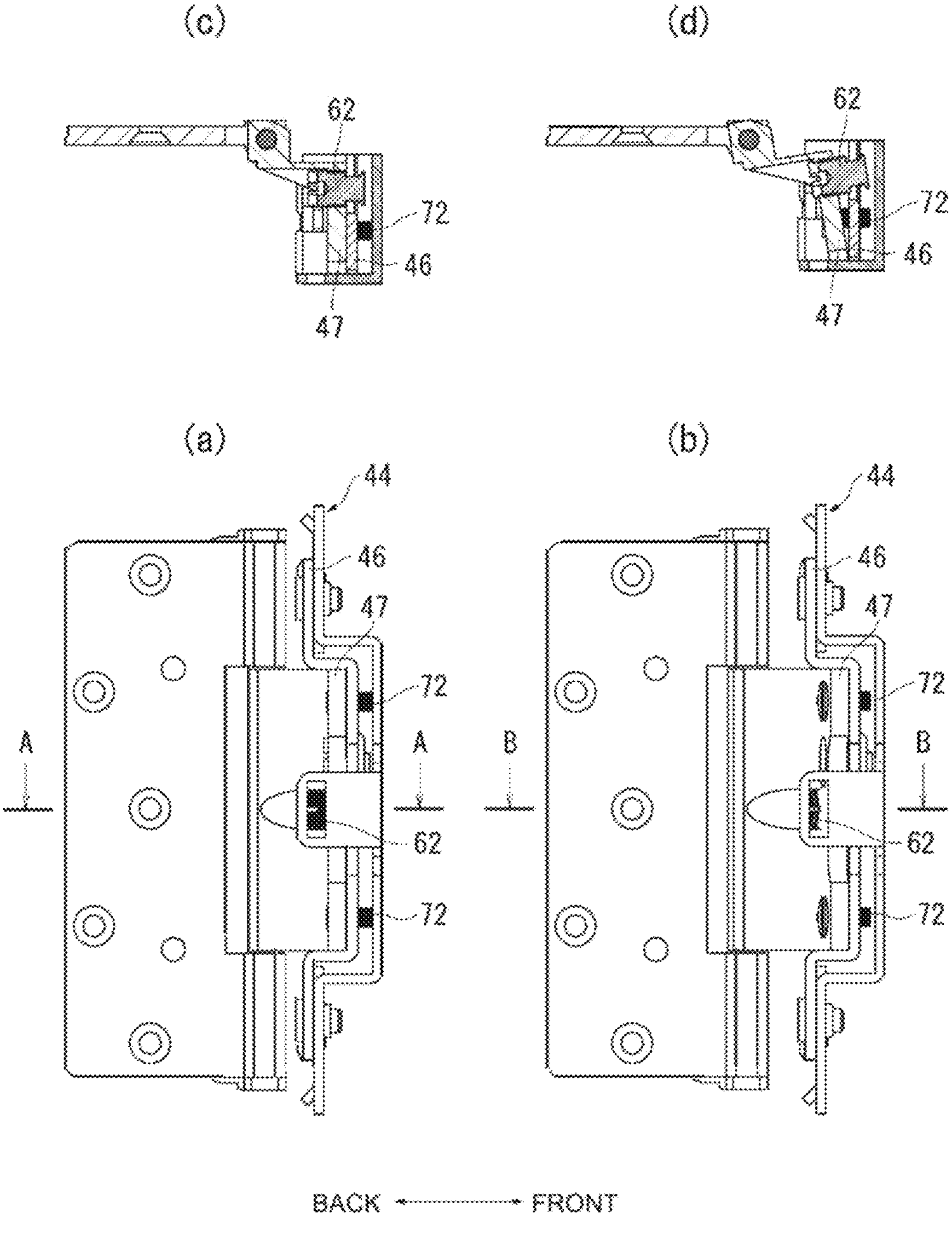
FIG. 27 is diagrams illustrating the adjustment of the position in the left-and-right direction (the front-and-back direction in FIG. 27) of the door in the closed position (FIG. 27(*a*) illustrates the back-end position of the middle plate, FIG. 27(*b*) illustrates the front-end position of the middle plate, FIG. 27(*c*) is a cross-sectional view along line A-A in FIG. 27(*a*), and FIG. 27(*d*) is a cross-sectional view along line B-B in FIG. 27(*b*)).

FIG. 27(*a*) illustrates a state where the middle plate 46 has been adjusted to the back-end position (the back-end position of when the second piece 44 is in the 90-degree open position) relative to the second piece body 47, and FIG. 27(*b*) illustrates a state in the front-end position after adjustment. FIG. 27(*c*) represents a cross-sectional view along line A-A in FIG. 27(*a*), and FIG. 27(*d*) represents a cross-sectional view along line B-B in FIG. 27(*b*). As illustrated in FIGS. 27(*a*) to 27(*d*), in order to adjust the position in the left-and-right direction of the door 5, the screw 72 is loosened to make the middle plate 46 movable in the front-and-back direction (the front-and-back direction in the drawing) relative to the second piece body 47, and then the left-and-right adjustment screw 62 is rotated, and the middle plate 46 is pivoted on an end of the second piece body 47 relative to the second piece body 47 (refer to FIGS. 27(*c*) and 27(*d*)) to adjust the position of the middle plate 46 in the front-and-back direction (the front-and-back direction in the drawing). After the position adjustment, the screw 72 is tightened to secure the second piece body 47 to the middle plate 46.

According to the hinge of the fifth embodiment, the three-dimensional position adjustment mechanisms are concentrated on the second piece 44 side. Therefore, the opening of the door 5 allows adjusting the three-dimensional position of the door 5. Hence, the adjustment of the position of the door 5 is easy. Moreover, there is no need to provide a position adjustment mechanism on the first piece 43 side. Therefore, the first piece 43 can be reduced in thickness, and it is not necessary to provide a deep recessed portion to the side jamb 6.

The present description is based on Japanese Patent Application. No. 2020-094092 filed on May 29, 2020, and Japanese Patent Application No. 2020-196876 filed on Nov. 27, 2020, the entire contents of which are incorporated herein.

REFERENCE SIGNS LIST

1 Hinge
2 Shaft
3 First piece
4 Second piece
5 Door
6 Side jamb
**6*b*** Recessed portion
**7*a*** Wall surface
8 Protruding portion
**8*a*** Front surface of protruding portion
**8*c*** Outside surface of protruding portion
**12*a*, 12*b*** Tubular portion of first piece
**12*a*1, 12*b*1** Front surface of tubular portion
**12*a*2, 12*b*2** Outside surface of tubular portion
14 Tubular portion of second piece
**14*a*** Front surface of tubular portion.
**14*b*** Outside surface of tubular portion
16 Cover
21 Hinge
22 Shaft
23 First piece
24 Second piece
**32*a*, 32*b*** Tubular portion of first piece
**32*a*1, 32*b*1** Front surface of tubular portion
**32*a*2, 32*b*2** Outside surface of tubular portion
34 Tubular portion of second piece
**34*a*** Front surface of tubular portion
**34*b*** Outside surface of tubular portion
41 Hinge
43 First piece
44 Second piece
45 Mounting plate
46 Middle plate
47 Second piece body
C Center of shaft
X Front surface line of protruding portion

The invention claimed is:

1. A hinge mounting structure comprising a hinge including a first piece and a second piece that are coupled together via a shaft in such a manner as to be rotatable relative to each other, the first piece being mounted on a side jamb, the second piece being mounted on a door, wherein the side jamb is provided with a protruding portion protruding forward of a wall surface, a center of the shaft is placed backward of a front surface line of the protruding portion of the side jamb, wherein in the hinge mounting structure placed between an inside surface and an outside surface of the protruding portion of the side jamb, the first piece comprising a tubular portion into which the shaft is inserted, the second piece comprising a tubular portion into which the shaft is inserted, the tubular portion of the first piece and the tubular portion of the second piece are placed side by side in the longitudinal direction of the shaft, an opening that is connected to the inside surface, a front surface, and the outside surface of the protruding portion is formed in a part of the protruding portion of the side jamb, and the tubular portion of the first piece and the tubular portion of the second piece are placed in the opening and are exposed from the opening when the door is in a closed position.

2. The hinge mounting structure according to claim 1, wherein a front surface of the tubular portion of the first piece and a front surface of the tubular portion of the second piece is placed substantially in the same plane as a front surface of the protruding portion, in a closed position of the door.

3. The hinge mounting structure according to claim 1, wherein an outside surface of the tubular portion of the first piece and an outside surface of the tubular portion of the second piece is placed substantially in the same plane as the outside surface of the protruding portion, in the closed position of the door.

4. The hinge mounting structure according to claim 1 wherein the first piece is placed in a recessed portion provided in the side jamb.

5. The hinge mounting structure according to claim 4, wherein a part of the recessed portion penetrates the side jamb in a left-and-right direction.

6. The hinge mounting structure according to claim 1, wherein the second piece includes: a mounting plate configured to be mounted on the door; a second piece body provided with the tubular portion; and a middle plate placed between the mounting plate and the second piece body, and the mounting plate is capable of adjusting a position thereof relative to the second piece body to allow adjustments to the position of the door in a front-and-back direction, an up-and-down direction, and a left-and-right direction.

* * * * *